US008462766B2

(12) United States Patent
Wiatrowski et al.

(10) Patent No.: US 8,462,766 B2
(45) Date of Patent: Jun. 11, 2013

(54) METHODS AND APPARATUS FOR DIFFUSING CHANNEL TIMING AMONG SUBSCRIBER UNITS IN TDMA DIRECT MODE

(75) Inventors: David G. Wiatrowski, Woodstock, IL (US); John P. Belmonte, Schaumburg, IL (US); Dipendra M. Chowdhary, Hoffman Estates, IL (US); Yueh Ching Chung, Pul (MY)

(73) Assignee: Motorola Solutions, Inc., Schaumburg, IL (US)

( * ) Notice: Subject to any disclaimer, the term of this patent is extended or adjusted under 35 U.S.C. 154(b) by 347 days.

(21) Appl. No.: 13/042,342

(22) Filed: Mar. 7, 2011

(65) Prior Publication Data

US 2012/0230322 A1 Sep. 13, 2012

(51) Int. Cl.
*H04J 3/06* (2006.01)
(52) U.S. Cl.
USPC ............................ 370/350; 370/337; 370/347
(58) Field of Classification Search
None
See application file for complete search history.

(56) References Cited

U.S. PATENT DOCUMENTS

| 4,698,805 | A | 10/1987 | Sasuta et al. |
| 5,020,130 | A | 5/1991 | Grube et al. |
| 5,179,720 | A | 1/1993 | Grube et al. |
| 5,226,045 | A | 7/1993 | Chuang |
| 5,287,551 | A | 2/1994 | Gustafson, Jr. et al. |
| 5,329,558 | A | 7/1994 | Larsson et al. |
| 5,519,710 | A | 5/1996 | Otsuka |
| 5,699,388 | A | 12/1997 | Wang et al. |
| 5,724,515 | A | 3/1998 | Barnes et al. |
| 5,734,643 | A | 3/1998 | Rondeau |
| 5,759,936 | A | 6/1998 | Christiansen et al. |
| 5,761,211 | A | 6/1998 | Yamaguchi et al. |
| 5,774,786 | A | 6/1998 | Wirtjes et al. |
| 5,905,965 | A | 5/1999 | Asano et al. |

(Continued)

FOREIGN PATENT DOCUMENTS

| EP | 0689303 A1 | 12/1995 |
| EP | 0886451 A1 | 12/1998 |

(Continued)

OTHER PUBLICATIONS

ETSI TS 102 361-1 v1.4.5, "Electromagnetic compatibility and Radio spectrum Matters (ERM); Digital Mobile Radio (DMR) System; Part 1: DMR Air Interface (AI) protocol," Dec. 2007, ETSI.*

(Continued)

*Primary Examiner* — Jae Y Lee
(74) *Attorney, Agent, or Firm* — Valerie M. Davis; Kenneth A. Haas

(57) ABSTRACT

A method for diffusing channel timing among a plurality of subscriber units operating in TDMA Direct Mode, wherein the method includes: receiving, from a second one of the subscriber units operating in the TDMA Direct Mode, a first message; determining first channel timing from the received message; determining whether the received first channel timing is correct, wherein the determining is based at least on comparing a generation of the first subscriber unit with a generation of the second subscriber unit; when the received first channel timing is correct, starting a random delay; upon expiration of the random delay, transmitting a first forced propagation message to propagate the first channel timing to at least a third one of the subscriber units operating in the TDMA Direct Mode and having a higher generation than the generations of the first and the second subscriber units.

17 Claims, 15 Drawing Sheets

U.S. PATENT DOCUMENTS

| | | | |
|---|---|---|---|
| 6,052,557 | A | 4/2000 | Kinnunen et al. |
| 6,052,562 | A | 4/2000 | Dorenbosch |
| 6,061,568 | A | 5/2000 | Dent |
| 6,097,928 | A | 8/2000 | Jeon |
| 6,144,656 | A | 11/2000 | Kinnunen et al. |
| 6,169,728 | B1 | 1/2001 | Perreault et al. |
| 6,411,614 | B1 | 6/2002 | Weigand |
| 7,050,419 | B2 | 5/2006 | Azenkot et al. |
| 7,203,207 | B2 | 4/2007 | Hiben |
| 7,499,441 | B2 | 3/2009 | Wiatrowski |
| 8,045,499 | B2 | 10/2011 | Wiatrowski et al. |
| 8,139,597 | B2 | 3/2012 | Chowdhary et al. |
| 8,184,654 | B2 | 5/2012 | Patel et al. |
| 8,284,756 | B2 | 10/2012 | Tay |
| 2002/0173311 | A1 | 11/2002 | Biggs et al. |
| 2003/0002456 | A1 | 1/2003 | Soomro et al. |
| 2003/0058925 | A1 | 3/2003 | Jechoux et al. |
| 2003/0076842 | A1 | 4/2003 | Johansson et al. |
| 2003/0153319 | A1 | 8/2003 | Wieczorek et al. |
| 2004/0196872 | A1 | 10/2004 | Nakamura |
| 2005/0068928 | A1 | 3/2005 | Smith et al. |
| 2005/0070320 | A1 | 3/2005 | Dent |
| 2005/0153666 | A1 | 7/2005 | Nguy et al. |
| 2005/0153723 | A1 | 7/2005 | Hosur et al. |
| 2005/0174963 | A1 | 8/2005 | Hsu |
| 2005/0277383 | A1 | 12/2005 | Reid |
| 2006/0013188 | A1 | 1/2006 | Wiatrowski et al. |
| 2006/0041680 | A1 | 2/2006 | Proctor, Jr. et al. |
| 2006/0198346 | A1 | 9/2006 | Liu et al. |
| 2006/0221887 | A1 | 10/2006 | Newberg et al. |
| 2006/0234748 | A1 | 10/2006 | Baik |
| 2006/0245454 | A1 | 11/2006 | Balasubramanian et al. |
| 2007/0104139 | A1 | 5/2007 | Marinier et al. |
| 2007/0129079 | A1 | 6/2007 | Schwarz et al. |
| 2007/0275756 | A1 | 11/2007 | Choi |
| 2008/0008153 | A1 | 1/2008 | Hiben et al. |
| 2008/0151849 | A1 | 6/2008 | Utsunomiya et al. |
| 2008/0165759 | A1 | 7/2008 | Khoo et al. |
| 2008/0219191 | A1 | 9/2008 | Wang et al. |
| 2008/0225821 | A1 | 9/2008 | Faith |
| 2008/0232344 | A1 | 9/2008 | Basu et al. |
| 2009/0016283 | A1 | 1/2009 | Zhang et al. |
| 2009/0016321 | A1* | 1/2009 | Li et al. ............ 370/350 |
| 2009/0034432 | A1 | 2/2009 | Bonta et al. |
| 2009/0059877 | A1 | 3/2009 | Utsunomiya et al. |
| 2009/0219916 | A1 | 9/2009 | Bohn |
| 2009/0290511 | A1 | 11/2009 | Budampati et al. |
| 2009/0310570 | A1* | 12/2009 | Smith ............ 370/335 |
| 2010/0086092 | A1 | 4/2010 | Wiatrowski et al. |
| 2010/0087142 | A1 | 4/2010 | Panpaliya et al. |
| 2010/0279726 | A1 | 11/2010 | Bohn et al. |
| 2010/0303033 | A1 | 12/2010 | Shahar et al. |
| 2011/0026514 | A1 | 2/2011 | Tay |
| 2011/0096747 | A1 | 4/2011 | Seok |
| 2011/0216746 | A1 | 9/2011 | Tay |
| 2011/0218008 | A1 | 9/2011 | Sim et al. |
| 2011/0255527 | A1* | 10/2011 | Chowdhary et al. .......... 370/347 |
| 2012/0135765 | A1* | 5/2012 | Khoo et al. ............ 455/509 |

FOREIGN PATENT DOCUMENTS

| | | |
|---|---|---|
| EP | 0991216 A2 | 4/2000 |
| EP | 1389025 A1 | 2/2004 |
| EP | 1976165 A2 | 10/2008 |
| GB | 2271690 A | 4/1994 |
| GB | 2409129 A | 6/2005 |
| KR | 10-0349664 B1 | 8/2002 |
| KR | 10-2008-0021454 A | 3/2008 |
| WO | 2005107098 A1 | 11/2005 |
| WO | 2006087265 A1 | 8/2006 |
| WO | 2007036111 A1 | 4/2007 |

OTHER PUBLICATIONS

Non Final Office Action mailed Jan. 16, 2013 in related U.S. Appl. No. 12/761,023, Thomas B. Bohn, filed Apr. 15, 2010.

Notice of Allowance mailed Feb. 5, 2013 in related U.S. Appl. No. 13/557,903, Dipendra M. Chowdhary, filed Jul. 25, 2012.

Notice of Allowance mailed Mar. 7, 2013 in U.S. Appl. No. 12/760,787, Dipendra M. Chowdhary, filed Apr. 15, 2010.

Choon Geun Cho, Application PCT/US2009/058326—PCT International Search Report and Written Opinion, WIPO, ISA/KR, Korean Intellectual Property Office, Daejeon, Republic of Korea, May 10, 2010, 10 pages, most relevant pp. 6-7 and 10 for related U.S. Appl. No. 12/331,189.

PCT Notification Concerning Transmittal of International Preliminary Report on Patentability Dated Apr. 14, 2011 for Related U.S. Appl. No. 12/331,189.

PCT International Search Report Dated Aug. 17, 2012 PCT/US2012/025795.

PCT International Search Report Dated March 3, 2011 for Related U.S. Appl. No. 12/760,787.

Ahmed Sobeih, Michel Hack, Zhen Liu and Li Zhang—"Almost Peer-to-Peer Clock Synchronization"—University of Illinois-IBM T.J. Watson Research Center—IEEE 2007—10 pages.

Non Final Office Action mailed on Oct. 10, 2012 in U.S. Appl. No. 12/760,787, Dipendra M. Chowdhary, filed Apr. 15, 2010.

Non Final Office Action mailed on May 11, 2012 in U.S. Appl. No. 12/760,787, Dipendra M. Chowdhary, filed Apr. 15, 2010.

Notice of Allowance mailed on Jul. 6, 2012 in U.S. Appl. No. 12/331,189, David G. Wiatrowski, filed Dec. 9, 2008.

Notice of Allowance mailed on May 18, 2012 in U.S. Appl. No. 12/331,189, David G. Wiatrowski, filed Dec. 9, 2008.

Non Final Office Action mailed on Oct. 4, 2011 in U.S. Appl. No. 12/331,189, David G. Wiatrowski, filed Dec. 9, 2008.

International Search Report and Written Opinion for International Patent Application No. PCT/US2009/058545 mailed on Apr. 30, 2010.

International Preliminary Report on Patentability and Written Opinion for International Patent Application No. PCT/US2009/058545 mailed on Apr. 14, 2011.

Notice of Allowance mailed on Nov. 7, 2011 in U.S. Appl. No. 12/331,180, Dipendra M. Chowdhary, filed Dec. 9, 2008.

Non Final Office Action mailed on May 27, 2011 in U.S. Appl. No. 12/331,180, Dipendra M. Chowdhary, filed Dec. 9, 2008.

Notice of Allowance mailed on Apr. 5, 2012 in U.S. Appl. No. 12/331,155, Tejal S. Patel, filed Dec. 9, 2008.

Notice of Allowance mailed on Dec. 14, 2011 in U.S. Appl. No. 12/331,155, Tejal S. Patel, filed Dec. 9, 2008.

Non Final Office Action mailed on Apr. 22, 2011 in U.S. Appl. No. 12/331,155, Tejal S. Patel, filed Dec. 9, 2008.

International Search Report and Written Opinion for International Patent Application No. PCT/US2009/058548 mailed on Apr. 15, 2010.

International Preliminary Report on Patentability and Written Opinion for International Patent Application No. PCT/US2009/058548 mailed on Apr. 14, 2011.

Notice of Allowance mailed on Aug. 8, 2011 in U.S. Appl. No. 12/331,137, David G. Wiatrowski, filed Dec. 9, 2008.

Ex Parte Quayle Action mailed on Jun. 24, 2011 in U.S. Appl. No. 12/331,137, David G. Wiatrowski, filed Dec. 9, 2008.

International Search Report and Written Opinion for International Patent Application No. PCT/US2009/058550 mailed on Apr. 30, 2010.

International Preliminary Report on Patentability and Written Opinion for International Patent Application No. PCT/US2009/058550 mailed on Apr. 14, 2011.

Final Office Action mailed on Jul. 19, 2012 in U.S. Appl. No. 12/331,167, Satish R. Panpaliya, filed Dec. 9, 2008.

Non Final Office Action mailed on Dec. 28, 2011 in U.S. Appl. No. 12/331,167, Satish R. Panpaliya, filed Dec. 9, 2008.

International Search Report and Written Opinion for International Patent Application No. PCT/US2011/029700 mailed on Nov. 25, 2011.

Notice of Allowance mailed on Sep. 18, 2012, in U.S. Appl. No. 12/761,023, Thomas B. Bohn, filed Apr. 15, 2010.

Non Final Office Action mailed on Apr. 20, 2012, in U.S. Appl. No. 12/761,023, Thomas B. Bohn, filed Apr. 15, 2010.

Supplementary European Search Report for European Application No. 09818325, mailed on Mar. 1, 2012.

Notice of Allowance mailed on Nov. 9, 2012 in U.S. Appl. No. 12/331,167, Satish R, Panpaliya, filed Dec. 9, 2008.

Supplementary European Search Report for European Application No. 09818328, European Patent Office, The Hague, Netherlands, mailed on Mar. 6, 2012.

Supplementary European Search Report for European Application No. 09818326, European Patent Office, The Hague, Netherlands, mailed on Feb. 27, 2012.

International Preliminary Report on Patentability and Written Opinion for International Patent Application No. PCT/US2010/062117 mailed on Oct. 26, 2012.

International Preliminary Report on Patentability and Written Opinion for International Patent Application No. PCT/US2011/029700 mailed on Oct. 26, 2012.

"Electromagnetic Compatibility and Radio Spectrum Matters (ERM), Digital Mobile Radio (DMR) Systems, Part 1 : DMRAir Interface (A1) Protocol," ESTI TS 102 361-1, V1.4.5, Dec. 2007-2012.

* cited by examiner

METHODS AND APPARATUS FOR DIFFUSING CHANNEL TIMING AMONG SUBSCRIBER UNITS IN TDMA DIRECT MODE

REFERENCE TO RELATED APPLICATIONS

The present application is related to the following U.S. application commonly owned together with this application by Motorola Solutions, Inc.:

Ser. No. 12/760,787 filed Apr. 15, 2010, titled "METHOD FOR SYNCHRONIZING DIRECT MODE TIME DIVISION MULTIPLE ACCESS (TDMA) TRANSMISSIONS" by Chowdhary, et al.;

TECHNICAL FIELD

The present disclosure relates generally to wireless communications and, in particular, to a method and apparatus for diffusing channel timing among a plurality of subscriber units operating in Time Division Multiple Access (TDMA) Direct Mode.

BACKGROUND

It is known for subscriber units (also interchangeably referred to herein as radios) to operate in "Direct Mode" (also referred to herein as "TDMA Direct Mode"). Direct Mode is defined as a mode of operation for two or more subscriber units, wherein the subscriber units communicate with each other without the need for any infrastructure equipment, such as a base station or repeater. This is in contrast to "repeater mode" defined as a mode of operation for two or more subscriber units, wherein the subscriber units communicate with each other using one or more pieces of infrastructure equipment. For instance, the European Telecommunications Standard Institute (ETSI) has published ETSI TS (Technical Specification) 102 361-1 (wherein the current version v1.4.5 dated December 2007 and all future versions are referred to herein as the ETSI-DMR standard), which describes a repeater mode and direct mode of operation for subscriber units.

The TDMA channel access method allows multiple stations (either mobile subscriber units and/or fixed end stations) to share the same transmission medium by dividing the transmission medium into time slots (or simply slots), wherein a time slot is defined as an elemental timing of a physical channel and is defined in 30 ms increments in the ETSI-DMR standard. A given TDMA system is characterized by the number of time slots supported in the system. For instance, a two-slot (or 2-slot) TDMA system (as described in the ETSI-DMR standard as 2:1 mode) supports two time slots for each physical channel. A four-slot TDMA system supports four time slots for each physical channel, and so on.

Ideally, each time slot supports a different traffic channel and, thereby, a different call. However, to avoid interference between transmitting subscriber units using the same physical channel (i.e., the same radio frequency channel) but different time slots, each subscriber unit should be aware of a common "channel timing" for the physical channel. As used herein, channel timing is defined as a timing reference that defines boundaries for one or more of the time slots that make up the physical channel. In other words, the channel timing defines a common time slot boundary reference for transmissions on the physical channel. Accordingly, the phrases "channel timing" and "time slot boundary reference" are used herein interchangeably.

The ETSI-DMR standard currently describes a means for an infrastructure device to provide common channel timing for subscriber units operating in repeater mode. Therefore, when the subscriber units are operating in repeater mode, two different non-interfering calls can be supported on the two time slots of a two-slot TDMA system. However, the ETSI-DMR standard does not presently describe a means for providing common channel timing to subscriber units operating in direct mode.

Therefore, what is needed is a technique for diffusing channel timing among subscriber units operating in TDMA direct mode.

BRIEF DESCRIPTION OF THE FIGURES

The accompanying figures, where like reference numerals refer to identical or functionally similar elements throughout the separate views, together with the detailed description below, are incorporated and form part of the specification and serve to further illustrate various embodiments of concepts that include the claimed invention, and to explain various principles and advantages of those embodiments.

Figure 1:
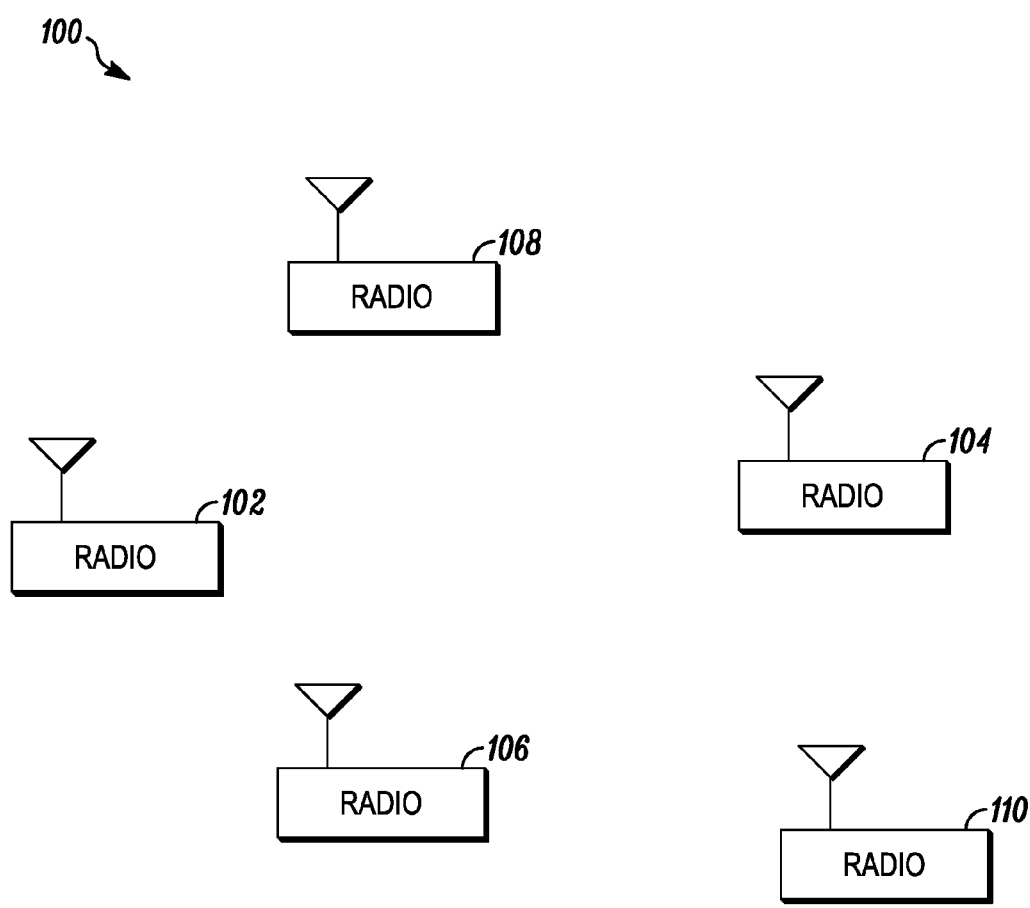
FIG. 1 is a block diagram of an illustrative direct mode wireless communication system operating in accordance with some embodiments.

Skilled artisans will appreciate that elements in the figures are illustrated for simplicity and clarity and have not necessarily been drawn to scale. For example, the dimensions of some of the elements in the figures may be exaggerated relative other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a method and apparatus for diffusing channel timing among a plurality of subscriber units operating in TDMA Direct Mode in order to create a common time slot boundary reference for these subscriber units, despite whether the subscriber units are aware of the presence of all of the other subscriber units operating in the system. In accordance with the present teachings, a method, performed by a first one of the plurality of subscriber units operating in the TDMA Direct Mode, includes receiving, from a second one of the plurality of subscriber units operating in the TDMA Direct Mode, a first message, and determining first channel timing from the first message. The method further includes determining whether the received first channel timing is correct. The determination of the correctness of the first channel timing is based at least on a comparison between a generation number of the first subscriber unit and a generation number of the second subscriber unit. In addition, the method includes starting a random delay (also referred to herein as a random delay timer and a random holdoff timer (RHOT)) when the received first channel timing is determined to be correct. Moreover, the method includes transmitting a first forced propagation message to propagate the first channel timing upon expiration of the random delay. The transmission of the forced propagation message enables the first channel timing to reach at least a third one of the plurality of subscriber units operating in the TDMA Direct Mode and having a higher generation than the generations of the first and the second subscriber units.

Further in accordance with the present teachings, a method, performed by a first one of the plurality of subscriber units operating in the TDMA Direct Mode, includes determining that the first subscriber unit does not have channel timing or has missed receiving a number of consecutive channel timing messages, such as beacon messages, forced propagation messages, correction messages, or terminator messages. The method further includes starting a random or fixed delay timer. In addition, the method includes transmitting a request message for channel timing when the random or fixed delay expires. Moreover, the method includes receiving, from a second one of the plurality of subscriber units operating in the TDMA Direct Mode, a response message, and determining channel timing from the response message. The method further includes determining whether the channel timing is correct, and accepting the channel timing when it is determined to be correct. The determining of whether the channel timing is correct is based at least on comparing a generation of the first subscriber unit with a generation of the second subscriber unit.

Referring now to the drawings, and in particular FIG. 1, an illustrative communication system implementing embodiments in accordance with the present teachings is shown and indicated generally at 100. System 100 comprises a plurality of radios 102 to 110 operating in TDMA Direct Mode in accordance with some embodiments of the present teachings. More particularly, radios 102 to 110 communicate using a plurality of radio frequencies (i.e., physical channels) each comprising a plurality (2, 4, etc.) of time slots, such that the slotting ratio is n:1 where n is an integer greater than 1, and the communications are performed without the need for any infrastructure equipment, such as for instance, repeaters.

In one illustrative implementation, the radios 102 to 110 operate in 6.25e 2:1 TDMA (i.e., two slots per physical channel with the slots labeled 1 and 2 and each slot being 30 ms in length) direct mode, wherein 6.25e operation refers to 6.25 kilohertz (kHz) equivalent spectral efficiency (one 12.5 kHz TDMA channel supports two communication channels). In another illustrative embodiment, the radios 102 to 110 operate in 12.5 kHz 2:1 TDMA direct mode, wherein 12.5 kHz operation refers to 12.5 kHz equivalent spectral efficiency (one 12.5 kHz TDMA channel supports one communication channel). However, these particular TDMA slot lengths, slotting ratios and channel bandwidth examples are in no way meant to limit the scope of the present teachings, and the teachings apply to other slotting ratios and channel bandwidths.

Moreover, in this illustrative system implementation, radios 102 to 110 operate over a "wide" area or wide region in which at least one radio has a transmission range (or simply range), also referred to herein as a transmit coverage area, that does not overlap with the transmission range of another radio in the system. As such, each radio is characterized by a generation number or value that provides an indication of how far away a radio is from a leader radio (also referred to as a timing leader), which is defined as the sole radio operating on a given physical channel that has a generation number zero (0) and that establishes the channel timing for that channel. In other words, the timing leader plays a role similar to a stratum-1 clock in the sense that it does not adjust its clock based on the message received (except when the timing leader first joins a system). However, the other radios adjust their clocks in order to remain as synchronized as possible with the timing leader.

Thus, only one generation 0 radio is elected for a given physical channel using any suitable election process, and all other generation numbers are determined with respect to the generation 0 radio. More particularly, generation 1 radios are defined as radios that can receive directly from the timing leader. Generation 2 radios are defined as radios that can receive directly from generation 1 radios, unless they are otherwise able to receive directly from generation 0 radios. Generation 3 radios are defined as radios that can receive directly from generation 2 radios, unless they can receive directly from generation 1 or 0 radios, and so on. In general, generation N+1 radios are those radios that can directly receive transmissions from generation N radios, and cannot directly receive transmissions from any radio with a generation lower than N. Accordingly, a higher generation number or value (or more simply stated a higher generation) for a radio indicates that that the radio is further away from the timing leader than a radio having a lower generation. Moreover, as mentioned above, a suitable election rule can be used to select a leader radio. The leadership election rule can comprise, for example, selecting the radio with the highest identification (ID) as the leader, selecting the radio with the lowest ID as the leader, or selecting the radio with the highest provisioned priority attribute as the leader, to name a few parameters.

The radios 102 to 110 are also referred to in the art as subscriber units (SU), user equipment (UE), access devices, access terminals, mobile stations, mobile radios, mobile devices, user devices, communication devices, and the like. The radios can be any type of communication device (either fixed or mobile) such as a mobile phone, a mobile data terminal, a Personal Digital Assistant (PDA), a laptop, a two-way radio, a cell phone, a fixed control station, or any other device capable of operating in a wired or wireless environment in direct mode. Moreover, although five radios are shown in FIG. 1, a communication system may typically include more such devices.

Each radio generally includes a memory (also referred to herein as a memory device), one or more network interfaces, and a processing device or processor (although not shown) that are operatively coupled, and which when programmed form the means for the radio to implement its functionality, for example, as illustrated by reference to the methods and diagrams shown in FIGS. 2-15. The network interfaces are used for passing signaling, also referred to herein as messaging, (e.g., messages, packets, datagrams, frames, superframes, bursts, or any other information blocks) between the radios of the system 100. The implementation of the network interfaces in a given device depends on the particular type of network, i.e., wired and/or wireless, to which the device is connected. For example, where the network supports wired communications, the interfaces may comprise a serial port interface (e.g., compliant to the RS-232 standard), a parallel port interface, an Ethernet interface, a USB interface, and/or a FireWire interface, and other well known interfaces. Where the network supports wireless communications, the network interfaces comprise elements including processing, modulating, and transceiver elements that are operable in accordance with any one or more standard or proprietary wireless over-the-air interfaces, wherein some of the functionality of the processing, modulating, and transceiver elements may be performed by means of the processing device through programmed logic such as software applications or firmware stored on the memory device of the system element or through hardware.

In addition to the above-mentioned functionality, implemented via programmed logic or code, the processor of the radios may be further programmed with software or firmware logic or code for performing signaling and functionality to facilitate methods in accordance with the teachings disclosed herein, such as, among others, methods described by reference to FIGS. 2-15. Furthermore, the processing device may be implemented in hardware, for example, as a state machine or an application specific integrated circuit, "ASIC" to perform such functionality. The memory in a radio includes any readily recognizable combination of short-term and long-term storage of software or firmware for programming the processing device with the logic or code needed to perform its functionality and for storage of various data needed for the functioning of the device.

Figure 2:
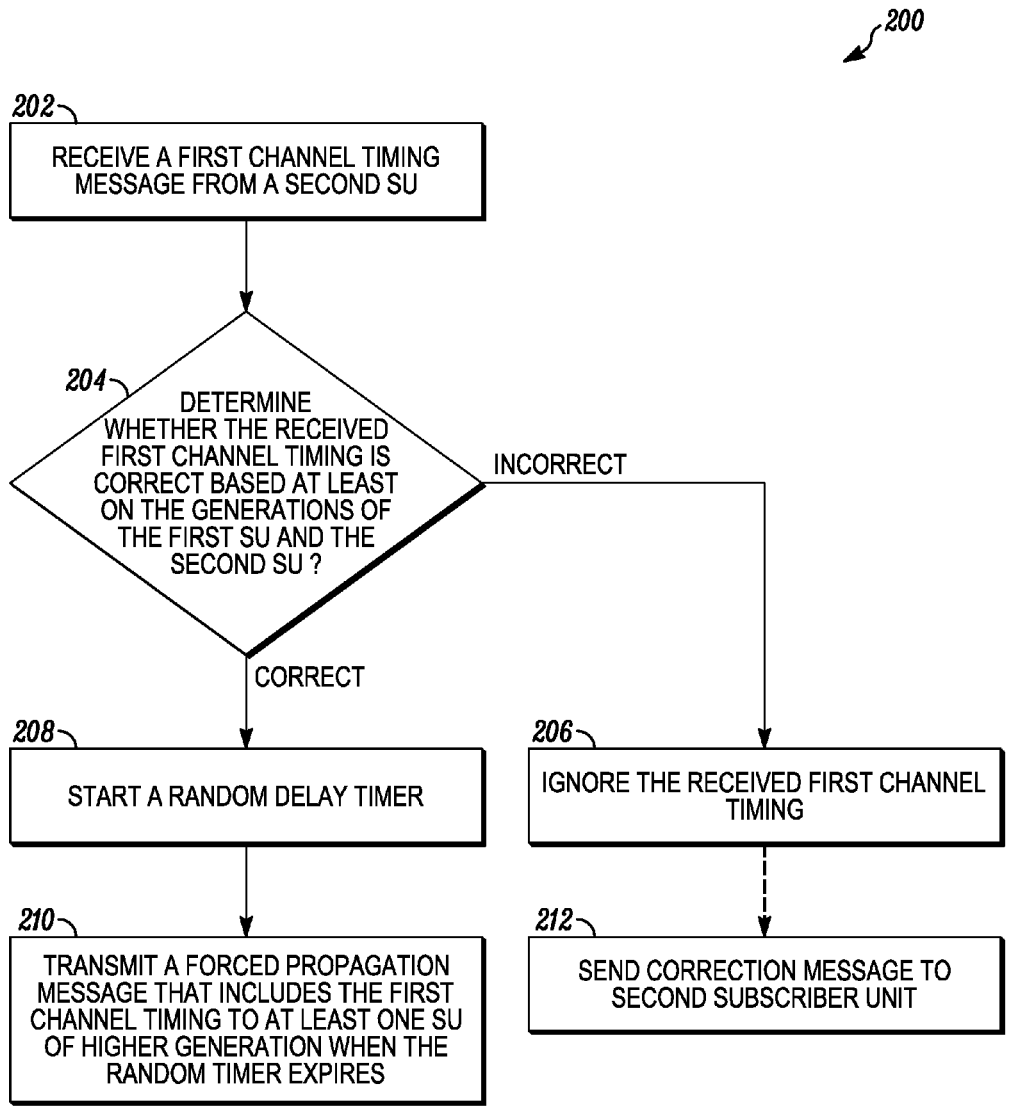
FIG. 2 is a flow diagram illustrating a method in accordance with some embodiments.

We now turn to a detailed description of the functionality of the system 100 in accordance with the teachings herein and by reference to the remaining FIGS. 2-15. FIG. 2 illustrates a logical flow diagram showing a general method 200 performed by a subscriber unit (also referenced as a "first subscriber unit") for diffusing channel timing among one or more other subscriber units operating in TDMA Direct Mode. At 202, the first subscriber unit receives a first channel timing message from a second subscriber unit in a time slot, wherein a channel timing message is defined as a message from which channel timing (i.e., a time slot boundary reference) can be determined for the corresponding time slot.

Figure 15:
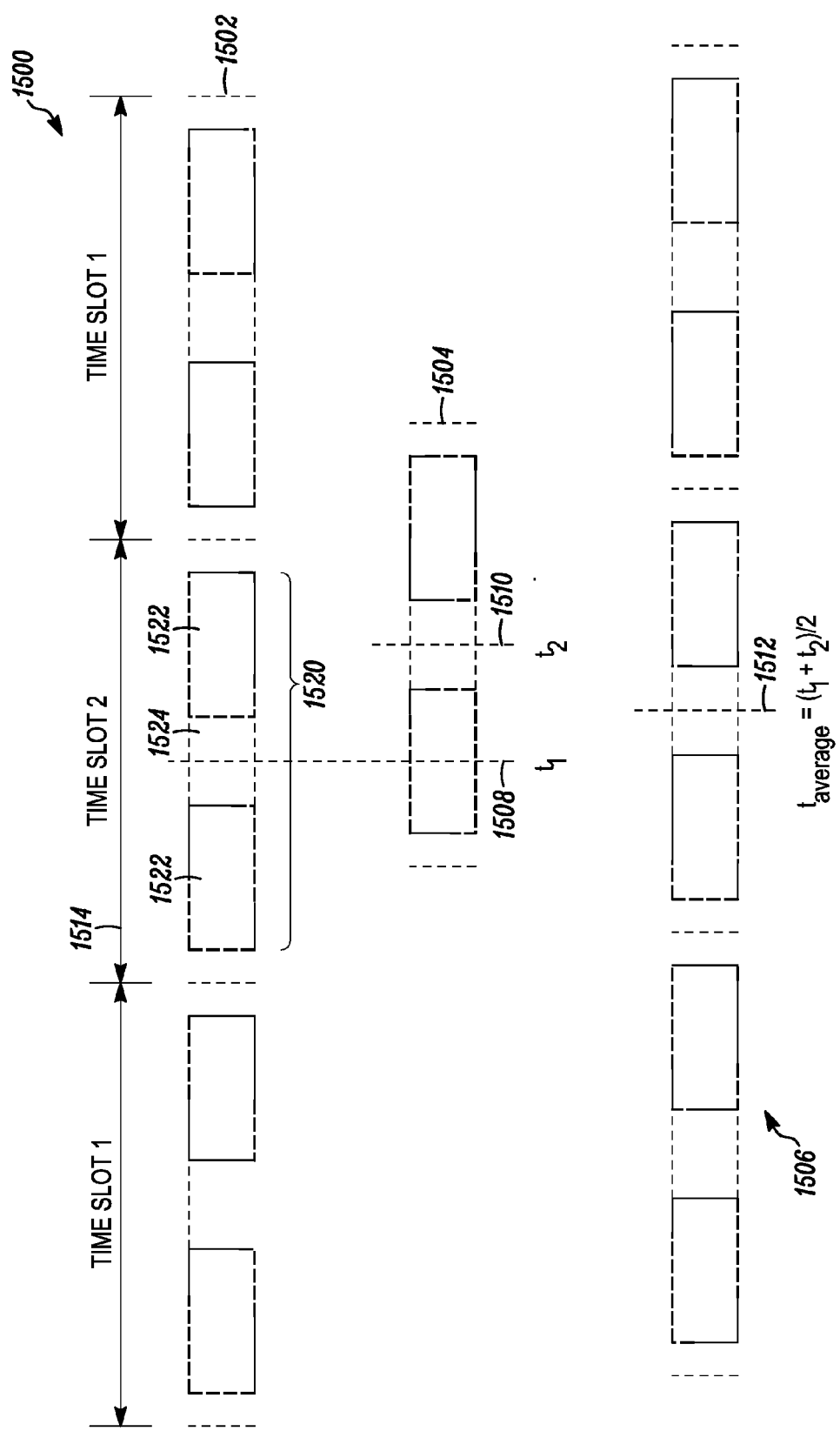
FIG. 15 illustrates time slot structures in accordance with some embodiments.

The channel timing can be determined from a channel timing message using any suitable technique. In one embodiment, channel timing for a time slot (in this case either time slot 1 or 2) is implicitly defined by the location of a synchronization word within a received channel timing message, wherein the time slot is identified in the synchronization word using, for instance, a selected synchronization patterns. Referring now momentarily to FIG. 15. FIG. 15 shows a 2:1 slotting ratio, wherein there are two time slots per physical channel. In one example, a receiving radio determines channel timing for time slot 2. In this example implementation, the receiving radio knows a synchronization pattern for time slot 2 (and time slot 1), which is contained in a synchronization word of one or more messages transmitted in timeslot 2 (and 1). For instance, a generation 0 radio transmits a beacon message or burst 1520 that has a burst structure defined in the ETSI-DMR standard, wherein the message 1520 is 27.5 ms in length and includes an info field 1522 on either side of a synchronization field 1524 that's located in the center of the burst and contains a synchronization word. The synchronization word includes at least the synchronization pattern identifying the time slot as time slot 2.

Accordingly, a receiving radio can use the synchronization pattern to synchronize to the center of the burst 1520 at a time $t_1$. Time $t_1$ can serve as the channel timing for time slot 2 or the time slot 2 boundary reference for transmissions in time slot 2 in that (assuming that this channel timing is "correct" as determined using the techniques described below) the receiving radio can synchronize its transmissions to the time $t_1$. More particularly, since in the ETSI-DMR standard, bursts for a time slot are transmitted every 60 ms (i.e., based on a slotting ratio of 2:1 and a time slot length of 30 ms), the receiving radio can adjust it's clock to transmit in time slot 2 such that the middle of its bursts are transmitted in time increments of 60 ms from $t_1$, such that the receiving radio transmits according to a time slot structure 1502. Thus, as can be seen in this example, channel timing is implicitly defined by the location of the synchronization word based on knowledge of the slotting ratio and the time slot length used in the system. It should be realized that this is just one illustrative technique to determine channel timing based or using a received message, and any suitable technique can be used.

Returning now to the description of FIG. 2, the first channel timing message can be a beacon message from the generation 0 radio (i.e., the channel timing leader radio), a forced propagation message (or simply propagation message) from a generation 1 or higher generation radio, a channel timing correction message, a terminator message, or a response message. The first channel timing message contains channel timing information also referred to herein as synchronization information (Sync Info), such as, by way of example, leader radio identifiers (IDs) (e.g., an extended leader ID), synchronization age (Sync Age), generation value of the sending radio, channel timing, etc. In an embodiment, this Sync Info (which is a part of the present teachings) is included in a Control Signaling Block (CSBK) burst structure, wherein the CSBK structure (but not the Sync Info) is defined the ETSI-DMR standard. This "enhanced" CSBK burst, which has the standard CSBK burst structure but that includes the novel Sync Info described in accordance with the present teachings is referred to herein as a Channel Timing (CT) CSBK.

Accordingly, the beacon message, the first propagation message, the correction message, the terminator message, or the response message can be a CT CSBK burst. As used herein, a beacon message is defined as a message or burst containing Sync Info that is transmitted by a generation 0 radio and from which channel timing is set for a time slot. A forced propagation message is defined as a stand alone message or burst containing Sync Info that is transmitted by a generation 1 or higher radio in response to determining that the received channel timing determined from a received beacon message, a received forced propagation message, or a received correction to a forced propagation message is correct for a time slot. A correction message is defined as a stand alone message or burst containing Sync Info that is transmitted by a generation 1 or higher radio in response to determining that the received channel timing determined from a received message or burst is incorrect for a time slot. A terminator message is defined as a message or burst containing Sync Info, which is appended to a voice or data transmission of generation 1 or higher radio in response to determining that the received channel timing determined from a received beacon message, a received forced propagation message, or a received correction to a forced propagation message is correct for a time slot. The response message is defined herein as a message or burst containing Sync Info, which is transmitted in response to receiving a request for channel timing from another subscriber unit.

At 204, the first subscriber unit determines "received" or "first" channel timing for the time slot (for instance using the synchronization word in the received first channel timing message, as described above) and determines whether the received channel timing is "correct." By "correct" or "accurate" channel timing what is meant is that the channel timing determined by the first subscriber unit from the first channel timing message is preferred by the first subscriber unit and/or is as good as or better than the channel timing currently used by the first subscriber unit, wherein the "correctness/accuracy" is determined based on a comparison between the Sync Info received in the first channel timing message and the Sync Info currently known, used, stored, or otherwise maintained at the first subscriber unit. Similarly, by "incorrect" or "inaccurate" channel timing what is meant is that the channel timing determined by the first subscriber unit from the first channel timing message is less preferred by the first subscriber unit and/or is worse than the channel timing currently used by the first subscriber unit, wherein the "incorrectness/inaccuracy" is determined based on a comparison between the Sync Info received in the first channel timing message and the Sync Info currently known, used, stored, or otherwise maintained at the first subscriber unit.

Accordingly, the determination of whether the received channel timing is correct is made is based at least on a comparison of the generations of the first and second subscriber units. For example, if the generation number of the second subscriber unit is greater than the generation number of the first subscriber unit, the received channel timing may be regarded as incorrect. In another example, if the generation number of the second subscriber unit is less than the generation number of the first subscriber unit, the received channel timing may be regarded as correct. Moreover, in an illustrative implementation described by reference to the remaining figures, in order to determine the correctness of the received channel timing, a comparison is also made between other Sync Info contained in the first channel timing message and that maintained by the first subscriber unit, including the leader ID information and the Sync Age.

If the received first channel timing is determined to be incorrect, the first subscriber unit ignores and drops the received first channel timing at 206. In addition, the first subscriber unit may send a channel timing correction message (also interchangeably referred to herein as correction message) to the second subscriber unit, at 212, from which the second subscriber unit determines correctness of channel timing, which in this case is the correctness of the channel timing maintained at the first subscriber unit. In accordance with the above-described technique, the first subscriber unit sends the correction message in the corresponding time slot, wherein the synchronization word in the correction message occurs at a time that defines what the first subscriber unit has determined to be the correct channel timing for the time slot.

In some implementations, more than one subscriber unit may receive the correction message. Upon receiving the correction message, the second (and perhaps other) subscriber unit determines whether the received channel timing determined from the correction message is correct and, thereby, accepts this received channel timing contained when determined to be correct.

Turning back to block 204, if the received first channel timing is determined to be correct and the first channel timing message is a beacon, a forced propagation message, or a correction to a forced propagation message (i.e., corrections to terminators or to responses not related to a forced propagation are not propagated), the first subscriber unit accepts the received first channel timing and starts a random delay timer at 208. Upon expiration of the random delay timer, the first subscriber unit transmits a forced propagation message that includes similar Sync Info as the first channel timing message but with the generation number incremented by one, in order to propagate the implicit channel timing for the time slot.

As used herein, a delay timer serves to delay the transmission of a message. Therefore, a delay timer is also interchangeably referred to herein as a delay. The forced propagation message is intended to reach at least one subscriber unit (i.e., a third subscriber unit) operating in the TDMA Direct Mode and having a higher generation number than the first subscriber unit. Upon receiving the forced propagation message, the third subscriber unit then performs the method 200 on the received forced propagation message. Accordingly, method 200 diffuses channel timing among a plurality of subscriber units operating in the TDMA Direct Mode. The forced propagation process is further illustrated by reference to FIG. 3 and FIG. 5.

Figure 3:
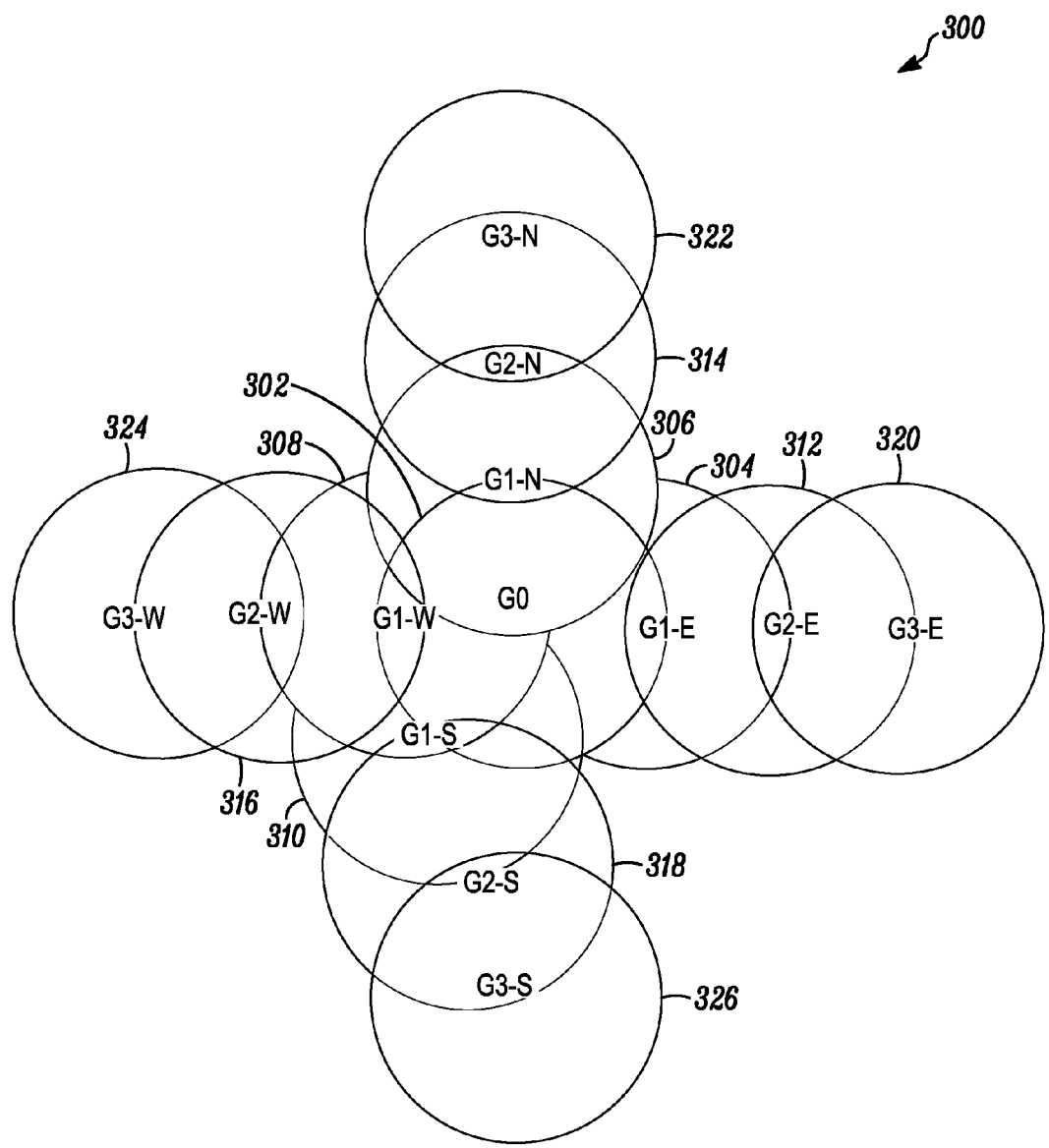
FIG. 3 is a radio coverage map illustrating a plurality of subscriber units operating in direct mode in accordance with some embodiments.

Referring now to FIG. 3, an illustrative radio coverage map of a wireless direct mode communication system 300 (i.e., a communication system that includes radios operating in direct mode), in accordance with some embodiments of the present teachings is shown. A generation 0 radio (indicated by G0) with a transmission range or transmit coverage area (also simply referred to herein as a coverage) 302 is the channel timing leader radio, which periodically transmits a beacon message to announce the channel timing to generation 1 radios within its transmission range. The time between two consecutive beacon messages is termed herein as a beacon interval, and in one illustrative implementation is 270 seconds based on assumptions about reference oscillator drift due to temperature and aging (to name just a couple factors).

Radios G1-E with a coverage 304, G2-E with a coverage 312, and G3-E with a coverage 320 are on the east side of radio G0. Radios G1-N with a coverage 306, G2-N with a coverage 314, and G3-N with a coverage 322 are on the north side of radio G0. Radios G1-W with a coverage 308, G2-W with a coverage 316, and G3-W with a coverage 324 are on the west side of radio G0. Radios G1-S with a coverage 310, G2-S with a coverage 318, and G3-S with a coverage 326 are on the south side of radio G0. The radio coverage map of the wireless communication system 300 is for illustration purposes only, and is not meant to show all possible locations of radios within a direct mode communication system. Therefore, there may also be radios (not shown) in the northwest, northeast, southwest, and southeast directions of the G0 radio in some implementation scenarios.

Four generation 1 radios (i.e., the G1-E radio, the G1-N radio, the G1-W radio, and the radio G1-S) are the radios that are within the physical coverage 302 of the G0 radio and can receive directly from the G0 radio. Accordingly, each of the four generation 1 radios periodically receives within a timeslot a beacon message having Sync Info from the G0 radio. Upon receiving the beacon message, each generation 1 radio starts a random hold off timer (RHOT), and, when the RHOT expires, transmits a forced propagation message within the corresponding time slot that propagates the channel timing for the time slot, which is set, implied or defined by or in some embodiments contained in the beacon message; and the forced propagation message also contains Sync Info in accordance with the teachings herein. Thus, as used in this context, the RHOT serves as a delay of the transmission of forced propagation message.

The generation 2 radios receive forced propagation messages directly from generation 1 radios. For example, the G2-E radio is within the physical coverage of the G1-E radio, and thus receives forced propagation messages directly from the G1-E radio. The generation 1 and 2 radios use the Sync Info in the received beacon and forced propagation messages, for example, to implement a channel timing diffusion process in accordance with the teachings herein by reference to the remaining figures to propagate channel timing for that time slot. The channel timing diffusion process is further illustrated by reference to FIG. 5.

Figure 5:
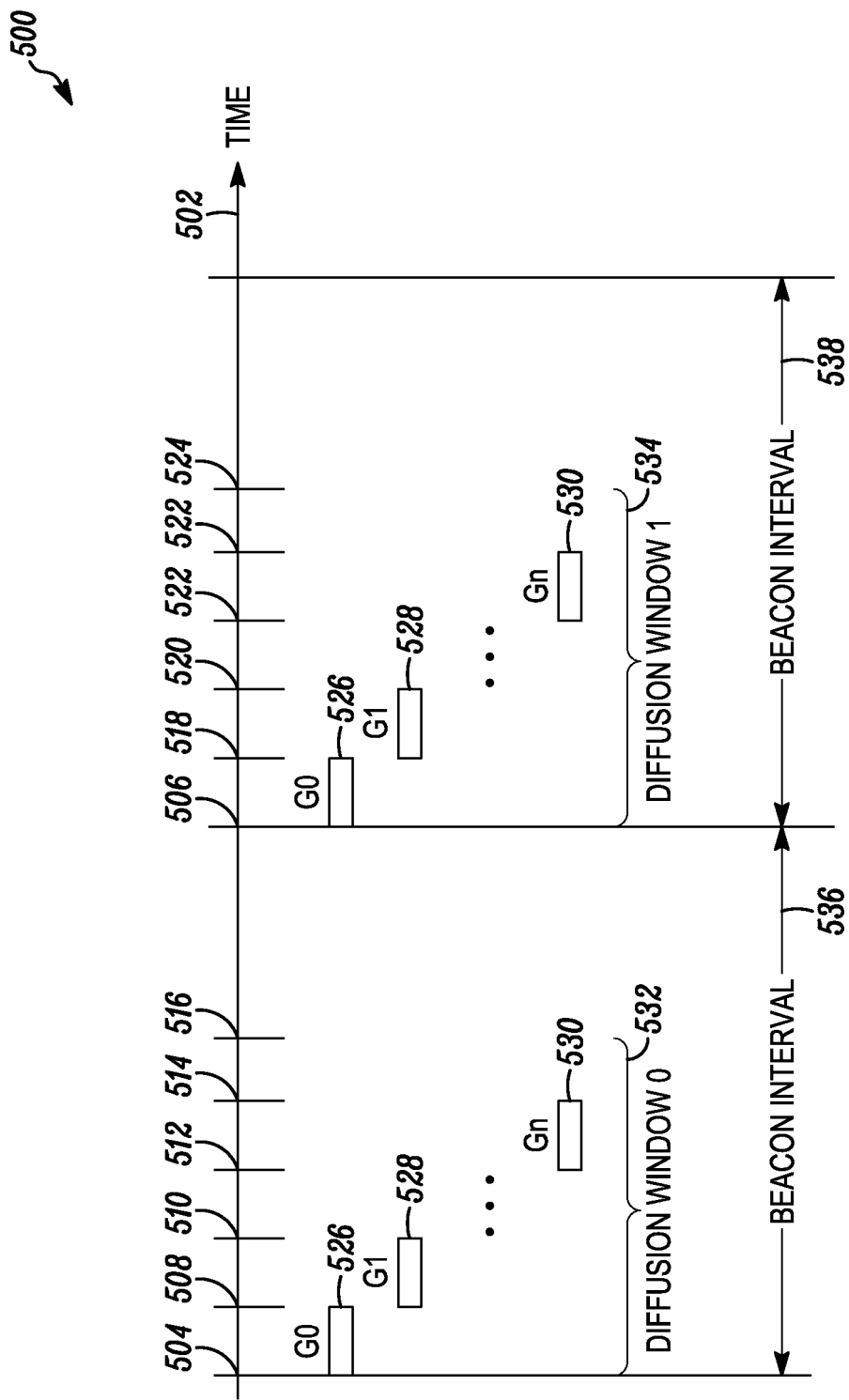
FIG. 5 is a timing diagram illustrating a channel timing diffusion method for subscriber units operating in direct mode in accordance with some embodiments.

Turning now to FIG. 5, a logical timeline flowchart illustrating a channel timing diffusion method 500 in accordance with some embodiments is shown. Timeline 502 represents time. Two consecutive beacon intervals 536 and 538 are shown in FIG. 5, and only the beacon interval 536 is discussed herein for brevity, but the following description also applies to the beacon interval 538. At time 504, a generation 0 radio (indicated by G0) starts a RHOT 526, and transmits a CT CSBK beacon message upon expiry of the RHOT. Before the expiration of the RHOT, the beacon message is not transmitted and is in a pending state. At time 508, a generation 1 radio (indicated by G1) receives the beacon message, and starts a second RHOT 528. Upon expiration of the second RHOT 528, the G1 radio transmits a forced propagation message that propagates the channel timing established by the G0 radio. Before the expiration of the second RHOT 528, the forced propagation message is not transmitted and is in a pending state. At time 510, a generation 3 radio (not shown) receives the forced propagation message from the G1 radio and continues to propagate the channel timing established by the G0 radio.

The amount of time between times 504 and 508 may be different from the amount of time between times 508 and time 510. In this cascading manner, a generation N radio (indicated by Gn) propagates channel timing to generation N+1 radios (not shown). The propagation process occurs during a time period called a Diffusion Window, such as Diffusion Window 0 532 and Diffusion Window 1 534. In an embodiment, the duration of the diffusion window is less than the duration of the beacon interval, and the beginning of the diffusion window is time aligned with the beginning of the beacon interval.

To prevent a channel from becoming clogged with an excessive number of forced propagation messages, a subscriber unit withholds and cancels the transmission of a pending forced propagation message when it receives, before the expiration of the RHOT, a forced propagation message from another subscriber unit that contains Sync Info that is as good as or better than the Sync Info currently maintained by the subscriber unit. When the subscriber unit withholds its pending forced propagation message, the subscriber unit also cancels its RHOT. In accordance with the present teachings, a subscriber unit of generation N does not start a RHOT or transmit a forced propagation message when the subscriber unit receives a forced propagation message from any subscriber unit of generation N or higher. Therefore, depending on where the radios are positioned or located within the direct mode system, a radio may not receive channel timing in some beacon intervals. The issue of missing a forced propagation message is further illustrated by reference to FIG. 3.

Turning back to FIG. 3, the G0 radio transmits a beacon message at the beginning of each Diffusion Window (and Beacon Interval). Each of the four generation 1 radios (i.e., the G1-E radio, the G1-N radio, the G1-W radio, and the radio G1-S) receives the beacon messages. Each generation 1 radio then starts a RHOT and would transmit a forced propagation message upon expiration of the RHOT, assuming that the RHOT is not canceled before its expiry. Suppose, however, that the RHOT of the G1-N radio expires first, then the G1-N radio transmits a forced propagation message which is received by the G2-N radio (but not the G1-E, G1-S, and G1-W radios), and the propagation process continues in the same fashion from the G2-N radio to provide or propagate the channel timing to the G3-N radio that is further north. It is likely that the forced propagation message sent b the G1-N radio is also received by the G0 radio. However, since G0 is a higher generation than G1, the G0 radio ignores the received forced propagation message, in accordance with the teachings herein.

Suppose that that the RHOT of the G1-E radio expires second, then the G1-E radio transmits a forced propagation message which is received by the G2-E radio (but not the G1-N, G1-S, and G1-W radios), and the propagation process continues in the same fashion to provide channel timing to the G3-E radio that is further east. Now, suppose that the RHOT of the G1-W radio expires third, then the G1-W radio transmits a forced propagation message which is received by the G2-W radio (but not the G1-N and G1-E radios), and the propagation process continues in the same fashion to provide channel timing to the G3-W radio that is further west.

As can be seen, however, the G1-S radio is also in the coverage of the G1-W radio. Therefore, the G1-S radio receives the forced propagation message transmitted by the G1-W radio. Upon receiving the forced propagation message from the G1-W radio, the G1-S radio cancels its own RHOT, and thus withholds transmission of its pending forced propagation message. Consequently, the G2-S radio and the G3-S radio fail to receive a forced propagation message during the current Diffusion Window and beacon interval. The problem of some subscriber units failing to receive a forced propagation message is solved by selecting a different distribution from which a timeout value for the sending subscriber unit's RHOT is drawn. In an illustrative implementation, the different distribution is based on one or both of the number of times a radio cancels its RHOT or when the subscriber last successfully transmitted a forced propagation message.

For example, since the G1-S radio canceled its RHOT in the above illustration, the G1-S radio will draw a timeout value for its next RHOT from a distribution with a smaller mean for sending its next forced propagation message. To the contrary, the G1-W radio successfully transmitted a forced propagation message during the current Diffusion Window, and will draw a timeout value for its next RHOT from a distribution with same or greater mean for sending its next forced propagation message. Consequently, during the next Diffusion Window, the RHOT of the G1-S radio will likely expire earlier than the RHOT of the G1-W radio. Accordingly, the propagation process from the G1-S radio to the G2-S radio and the G3-S radio will have a higher probability of success during the next Diffusion Window.

Figure 4:
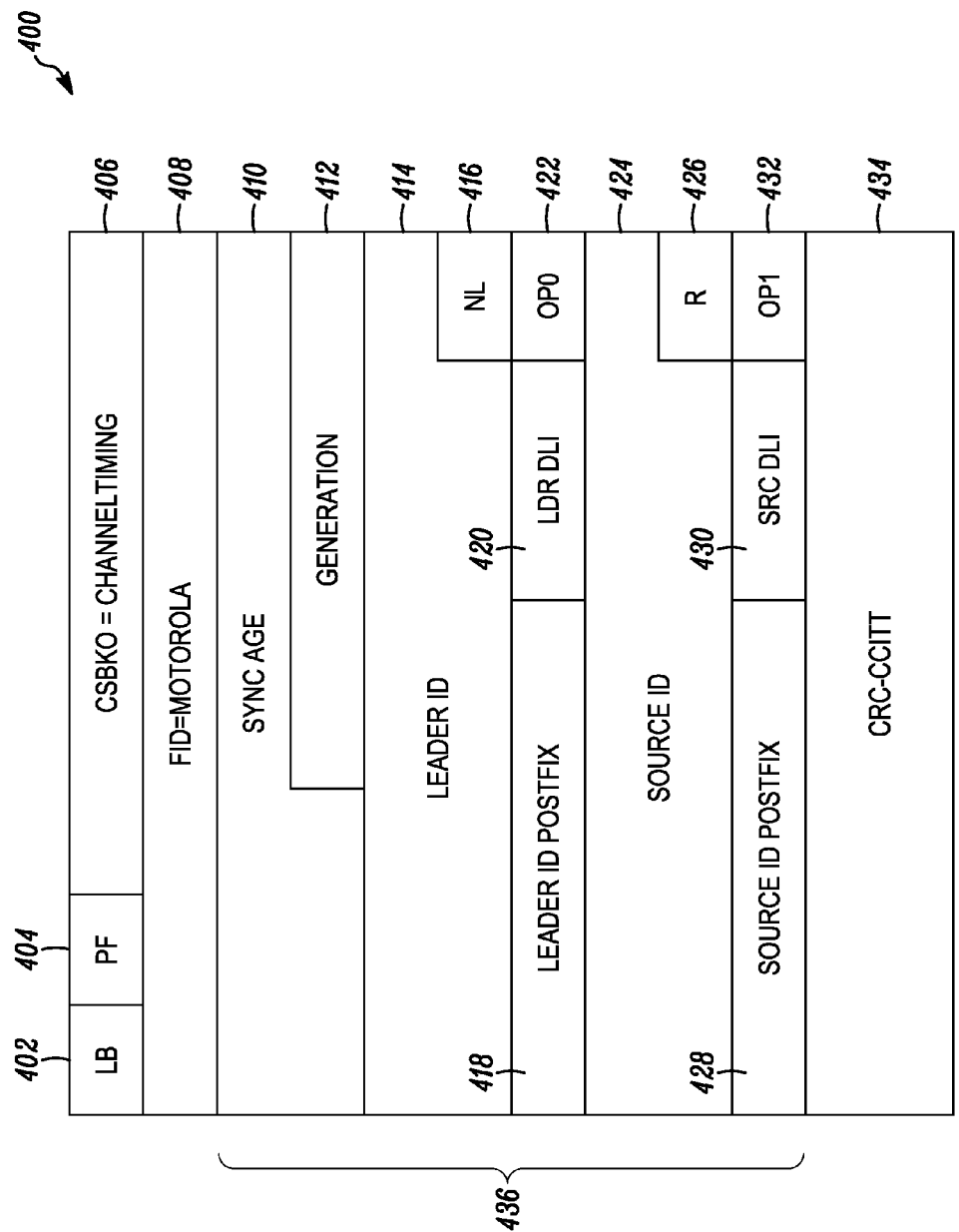
FIG. 4 illustrates a CT CSBK structure that includes information to verify accuracy of channel timing for subscriber units operating in direct mode in accordance with some embodiments.

As described above, in an embodiment each of a beacon message, a forced propagation message, a request message, a correction message, or a terminator message comprises a CT CSBK burst. Turning now to FIG. 4, a CT CSBK burst structure 400 in accordance with some embodiments of the present disclosure is illustrated. The twelve bytes long CT CSBK structure 400 comprises a last block (LB) field 402, a protect flag (PF) field 404, a CSBK Opcode (CSBKO) field 406, a feature identifier (FID) field 408, a data field 436, and a CRC (cyclic redundancy check) code field 434. In some embodiments of the present teachings, the CSBKO field 406 is set to a value of ChannelTiming to indicate that the burst includes the Sync Info to use in determining whether the channel timing indicated by the burst is the correct channel timing, the FID field 408 is set to a value to identify a set of features from which the CSBKO is specifying a feature, and the CRC code field 434 is set to a value calculated using a CCITT algorithm. Example FID values include $00_{16}$ which indicates one of the ETSI-DMR standard feature sets, or $10_{16}$ which indicates a set of features proprietary to a particular manufacturer.

The data field 436 comprises a Sync Age field 410. The Sync Age field 410 contains the synchronization age (Sync Age) of a subscriber unit and is an 11-bit measurement of time from the beginning of a Beacon Interval to the present moment and is reset to a lower value, possibly zero, upon reception of a CT CSBK containing a lower value. In one example implementation, Sync Age is measured in SyncAgeIncrement ticks, and has a value range between 0 and 2047. In some embodiments, each SyncAgeIncrement tick is about one half second. In other embodiments, each SyncAgeIncrement tick is 480 milliseconds. Generally, the Sync Age field 410 in a CT CSBK Beacon message contains a value of 0. However, there could be a small difference in Sync Age between the time of scheduling and the time of transmitting of the beacon message, due to a delay in accessing the channel. When such a difference is present, the Sync Age field 410 is set to a value at the time of transmitting to ensure a precise channel timing beacon interval.

In addition, when a subscriber unit does not know a channel timing leader radio, it sets the Sync Age field 410 to zero. For example, when a subscriber unit powers up, the subscriber unit has no knowledge of a channel timing leader radio. In all other situations, including a terminator message, a correction message, and a response message to a channel timing request message, a subscriber unit sets the Sync Age field 410 to the value of the subscriber unit's Sync Age at the time of transmission.

The data field 436 further comprises a generation field 412, which is set to the generation number of the present subscriber unit. For example, the G0 radio 302 sets the generation field 412 in beacon messages to zero, while the G1-E radio 312 sets the generation field 412 to one in forced propagation messages, correction messages, request messages, response messages, and terminator messages. A subscriber unit also sets the generation field 412 to zero when the subscriber unit does not know its generation number. For example, when the subscriber unit powers up, the subscriber unit does not know its generation. In one particular embodiment, the generation field 412 is a 5-bit field. Therefore, the generation number of any subscriber unit is in the range between 0 and 31. When a subscriber unit receives channel timing messages from a generation 31 subscriber unit, but not from any subscriber unit of generation 30 or lower, the subscriber unit sets its own generation number to 31.

In addition, the data field 436 comprises a leader identifier (ID) field 414 (e.g., 15 bits), a leader ID postfix field 418, a leader dynamic leader identifier (LDR DLI) field 420. The leader ID 414 identifies the subscriber unit that the generator of the CT CSBK burst 400 thinks is the channel timing leader radio. The leader ID postfix 418, used to make the leader ID 414 more unique across multiple communication systems, comprises in one embodiment a color code concatenated with a time slot. In an alternate embodiment, the leader ID postfix might be a value provisioned into the radio or a randomly generated number. The color code and the time slot are used by the channel timing leader radio (which is identified by the leader ID field 414) accordingly to the leader's selected channel. When a subscriber unit does not know a timing leader, it sets the leader ID field 414 and the leader ID postfix field 418 to 0. As used herein, a concatenation of the LDR DLI field 420, the leader ID field 414, and the leader ID postfix field 418 is termed as Extended Leader ID.

The 2-bit LDR DLI field 420 generally characterizes a subscriber unit's ability and preference to serve as a channel timing leader radio. For instance, a value of one ($01_2$) or two ($10_2$) in the LDR DLI field 420 means that the subscriber unit is able to be a channel timing leader radio, but should yield leadership to another subscriber unit with a higher value ($11_2$) in the LDR DLI field 420. In addition, a value of three ($11_2$) in the LDR DLI field 420 shows that the subscriber unit prefers to be a channel timing leader radio. In one example, a subscriber unit, such as a control station, is provisioned to be a desirable channel timing leader radio. This is because the control station typically has a tall antenna and higher ERP—effective radiated power, is typically turned on at all times, and typically is never tuned to a different channel.

The data field 436 further comprises a new leader (NL) field 416 and a channel timing operation code field (Op0 and Op1, where Op0 is the least significant bit and Op1 is the most significant bit) 422 and 432. In one illustrative implementation, the operation code field 422 and 432 is a 2-bit field and is further illustrated by reference to Table 1 below, which contains example values. Referring now to Table 1, the channel timing operation codes identify the purpose of the TDMA Direct Mode channel timing CT CSBK burst. For example, when the operation code field 422 and 432 has a value of zero ($00_2$), the CT CSBK burst is an unaligned request for channel timing. When the operation code field 422 and 432 has a value of one ($01_2$), the CT CSBK burst is an unaligned terminator specifying channel timing. When the operation code field 422 and 432 has a value of two ($10_2$), the CT CSBK burst contains channel timing status for aligned channel timing requests, aligned terminator, aligned response, or aligned correction without push. Moreover, when the operation code field 422 and 432 has a value of three ($11_2$), the CT CSBK burst is a channel timing push, such as a leader beacon or an aligned correction with push.

TABLE 1

| Channel Timing Opcode | Description |
|---|---|
| 0 | Unaligned request |
| 1 | Unaligned terminator |
| 2 | Channel timing status |
| 3 | Channel timing push |

Turning now back to FIG. 4, the data field 436 further comprises a 15-bit source ID field 424 that identifies the source or sending subscriber unit of the present CT CSBK burst. Working in the same manner as the leader ID postfix field 418, the source ID postfix field 428 makes the source ID 424 more unique across multiple communication systems by concatenating a color code and a time slot or some other designated parameter. In addition, the data field 436 comprises a source dynamic leader identifier (SRC DLI) field 430. The SRC DLI field 430 is constructed in the same manner as the LDR DLI field 420 is constructed. A value of zero ($00_2$), for instance, in the SRC DLI field 430 indicates that the source subscriber unit refuses, is unable, or is ineligible to be a channel timing leader radio. For example, the source subscriber unit is ineligible to be a channel timing leader radio when the source subscriber unit is provisioned not to be a channel timing leader radio, or is unable to be a channel timing leader because of a low battery. Moreover, the data field 436 comprises a reserved (R) field 426. When a subscriber unit is the channel timing leader radio, the leader ID field 414 and the leader ID postfix field 418 are identical to the source ID field 424 and the source ID postfix field 428 respectively.

When a subscriber unit receives a channel timing message, such as a beacon message or a forced propagation message, the subscriber unit evaluates the channel timing information (i.e., the Sync Info) contained in the received channel timing message, and compares the received Sync Info with the Sync Info that the subscriber unit presently possesses. If the received Sync Info is better than the subscriber unit's present Sync Info, the subscriber unit accepts the channel timing determined for the received channel timing message, and the accepted channel timing is regarded as the correct channel timing. When the received Sync Info is as good as the Sync Info maintained at the subscriber unit, channel timing averaging is performed. If the received Sync Info is not as good as the subscriber unit's present Sync Info, the subscriber unit's present channel timing is viewed as the correct channel timing. In the latter case, the subscriber unit rejects the received channel timing, and may optionally attempt to transmit a correction message (e.g., a CT CSBK burst with the appropriate Sync Info) to the sending subscriber unit indicating the correct channel timing.

Upon receiving a channel timing correction message, a subscriber unit evaluates the correction message in the same way that the subscriber unit evaluates a forced propagation message as illustrated above. In some embodiments in accordance with the present teachings, the subscriber unit transmits a forced propagation message when the channel timing based on the received correction message is correct. Similarly, in some embodiments, a subscriber unit may evaluate the channel timing determined based on a received terminator message in the same manner that the subscriber unit evaluates a forced propagation message as illustrated above. In addition, the subscriber unit transmits a forced propagation message when the channel timing based on the received terminator message is correct.

Figure 6:
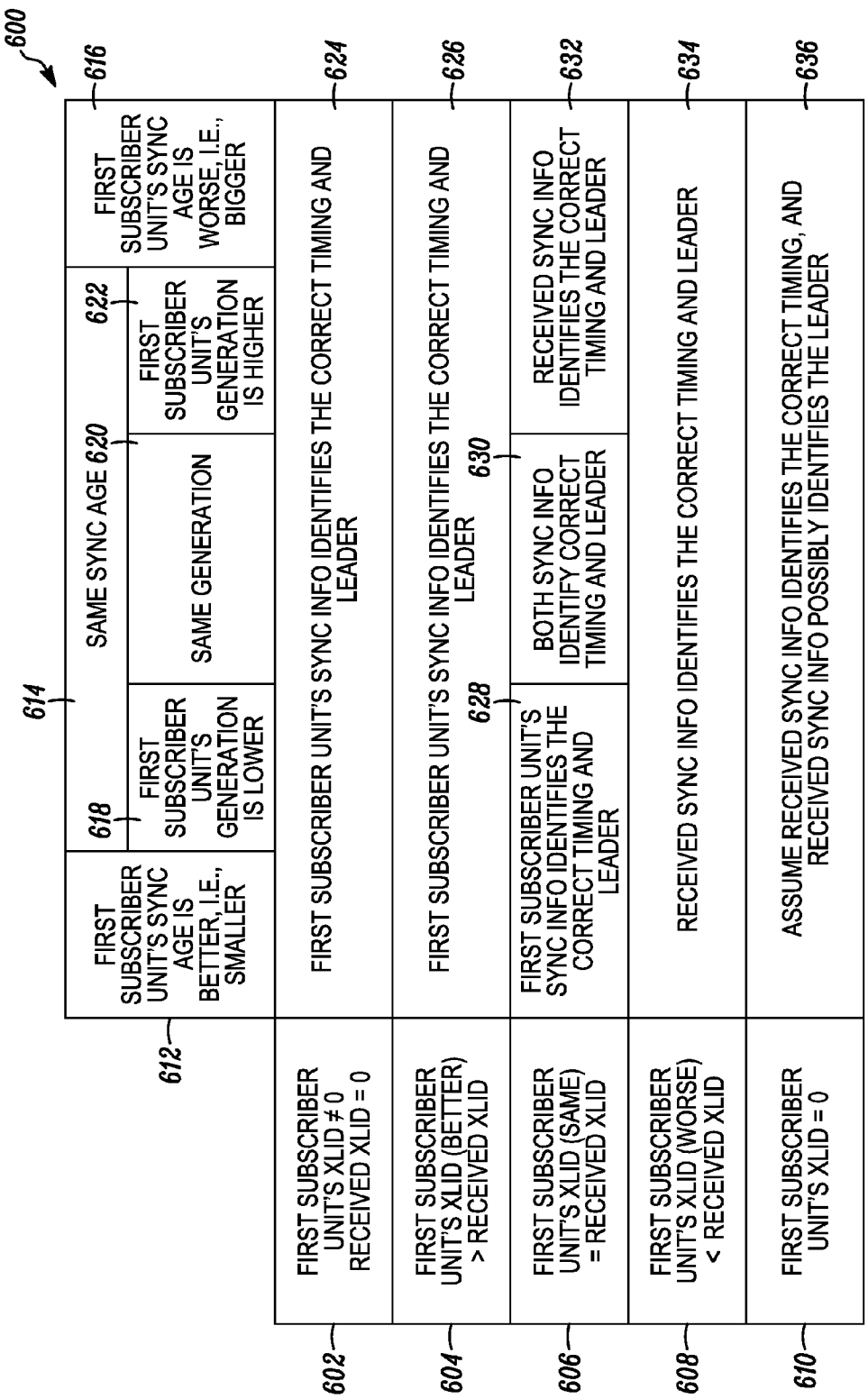
FIG. 6 is a decision table illustrating a method in accordance with some embodiments.

The evaluation and comparison of a subscriber unit's Sync Info (e.g., generation number, Sync Age, and Extended Leader ID (XLID)) and the Sync in a received channel timing message, such as a beacon message, a forced propagation message, a correction message, or a terminator message, is further illustrated by reference to FIGS. 6-8. Turning first to FIG. 6, a logical decision table illustrating a method 600 in accordance with some embodiments is shown. The method 600 is performed by a first subscriber unit when the first subscriber unit receives a channel timing message. A condition 602 occurs when the first subscriber unit has or knows a channel timing leader radio (i.e., the first subscriber unit's XLID≠0), and there is no leader (i.e., XLID=0) specified in the received Sync Info. As used herein, XLID (Extended Leader ID) is an identifier created by concatenating the LDR DLI field 420 (FIG. 4), the leader ID field 414 (FIG. 4), and the leader ID postfix field 418 (FIG. 4), wherein the LDR DLI is the most significant portion of the XLID while the leader ID postfix is the least significant portion of the XLID.

A condition 604 occurs when the first subscriber unit has a better leader ID than the leader ID in the Sync Info of the received channel timing message, e.g., the first subscriber unit's XLID is bigger than the XLID in the received channel timing. A condition 606 occurs when the first subscriber unit's XLID is same as the received XLID. A condition 608 occurs when the first subscriber unit's XLID is worse than the received XLID, e.g., the first subscriber unit's XLID is smaller than the received XLID. A condition 610 occurs when the first subscriber unit does not have a leader, e.g., the first subscriber unit's XLID is zero.

Conditions 612, 614, and 616 relate to comparing the first subscriber unit's Sync Age with the Sync Age in the Sync Info of the received channel timing message (e.g., in the Sync Age field 410 of FIG. 4). In one illustrative implementation, a Sync Age is regarded as better than another Sync Age if the value of the former is smaller than the value of the latter. In such a case, the latter Sync Age is regarded as worse than the former Sync Age. For example, condition 612 occurs when the first subscriber unit's Sync Age is smaller than the received Sync Age. Conditions 618, 620, and 622 relate to comparing the first subscriber unit's generation with the generation included in the Sync Info of the received channel timing message (e.g., in the generation field 412 of FIG. 4). For example, condition 618 occurs when the first subscriber unit's generation is smaller or lower than the received generation. Evaluation results 624, 626, 628, 630, 632, 634, and 636 depend on the conditions as described above.

Under both the conditions 602 and 604, the first subscriber unit's Sync Info identifies the correct leader radio and indicates that the subscriber unit's current channel timing is correct. Accordingly, the first subscriber unit's channel timing and leader radio are correct and will be used for purposes such as forced propagation. As used herein, Sync Info comprises the generation field 412, the Sync Age field 410, the leader ID field 414, the leader ID postfix field 418, and the LDR DLI field 420 of FIG. 4. In addition, when both the conditions 606 and 612 occur, the first subscriber unit's Sync Info identifies the correct leader radio and indicates that the subscriber unit's current channel timing is correct. Furthermore, when the conditions 606, 614, and 618 all occur, the first subscriber unit's Sync Info identifies the correct leader radio and indicates that the subscriber unit's current channel timing is correct. When the conditions 606, 614, and 620 all occur, both the first subscriber unit's Sync Info and the received Sync Info contained in the received channel timing message identify the correct leader radio and indicate the correct channel timing. In such a case, the first subscriber unit's channel timing will be set to the average of the first subscriber unit's current channel timing and the channel timing determined based on the received channel timing message. The case where the conditions 606, 614, and 620 all occur is further illustrated by reference to FIG. 15.

Turning now to FIG. 15, illustrative bursts within a 2:1 channel time slot structure are shown and indicated generally at 1500. A time slot structure 1502 represents the first subscriber unit's current time slot structure while a time slot structure 1506 represents the first subscriber unit's new time slot structure after adjusting its channel timing. The time slot structure 1502 comprises two time slots, 1 and 2. In alternate embodiments, the time slot structure 1502 may comprise more than two time slots.

In a time slot 2 (marked by 1514), the first subscriber unit received a CT CSBK burst 1520 (e.g., a beacon message from a leader radio containing Sync Info) from which the first subscriber unit determines (using the synchronization word in the center of the burst) channel timing $t_1$ 1508, which represents the current channel timing maintained by the subscriber unit for time slot 2 (wherein the technique for determining channel timing from or based on a received channel timing message can be as described above). In an alternative embodiment, this synchronization word is located in another area in the message such as at the beginning or the end of the burst.

Subsequently, the first subscriber unit receives another CT CSBK burst 1504 in time slot 2 (e.g., a forced propagation message), from which the first subscriber radio determines channel timing $t_2$ 1510, which represents the received channel timing maintained for time slot 2. Since the received Sync Info from burst 1520 and maintained by the first subscriber is as good as the Sync Info from the burst 1504 (e.g., the case where the conditions 606, 614, and 620 (FIG. 6) all occur), the first subscriber unit's current channel timing is set to the average (marked by 1512) of the first subscriber unit's current channel timing and the channel timing according to the received channel timing message 1504. Accordingly, the first subscriber unit's time slot structure becomes the time slot structure 1506.

In another illustrative implementation, the first subscriber unit receives a CT CSBK for time slot 1 that contains better Sync Info than the Sync Info currently maintained by the first subscriber unit. Accordingly, the first subscriber unit accepts the channel timing that it determines from the received CT CSBK for time slot 1 and changes its time slot structure to transmit using the accepted channel timing. In yet another illustrative implementation, the first subscriber unit receives a CT CSBK for time slot 1 that contains worse Sync Info than the Sync Info currently maintained by the first subscriber unit. Accordingly, the first subscriber unit ignores the received CT CSBK for time slot 1 and maintains the time slot structure 1502.

Turning now back to FIG. 6, under the condition 608, the received Sync Info identifies the correct leader radio and indicates that the channel timing based on the received channel timing message is correct. In addition, when both the conditions 606 and 616 occur, the received Sync Info identifies the correct leader radio and indicates that the channel timing based on the received channel timing message is correct. Moreover, when the conditions 606, 614, and 622 all occur, the received Sync Info identifies the correct leader radio and indicates that the channel timing based on the received channel timing message is correct. Under condition 610 where the first subscriber unit's XLID is zero, the first subscriber unit assumes that the received Sync Info indicates that the channel timing based on the received channel timing message is correct and the received Sync Info possibly identifies the correct channel timing leader radio.

Figure 7:
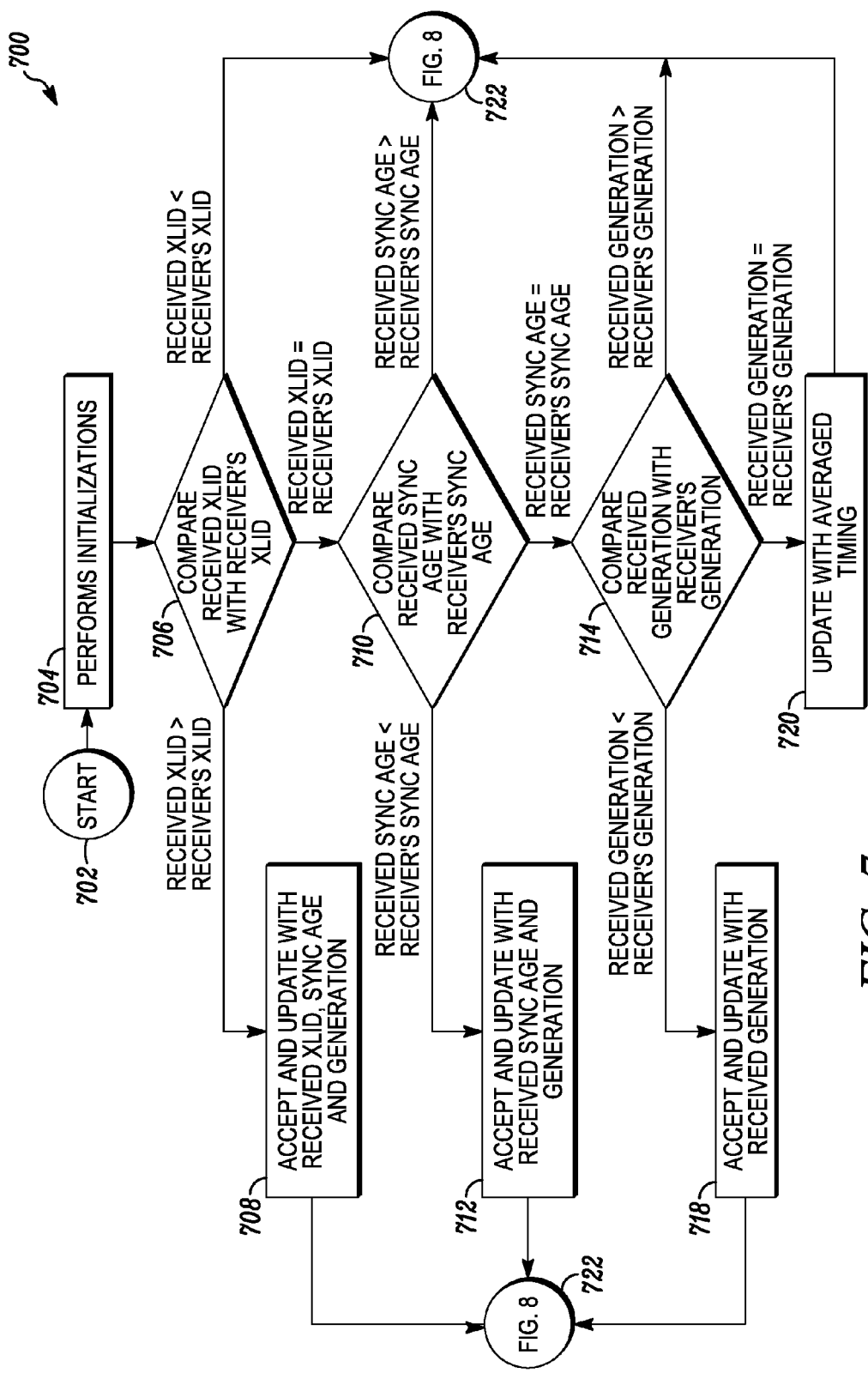
FIG. 7 is a flow diagram illustrating a method in accordance with some embodiments.
Figure 8:
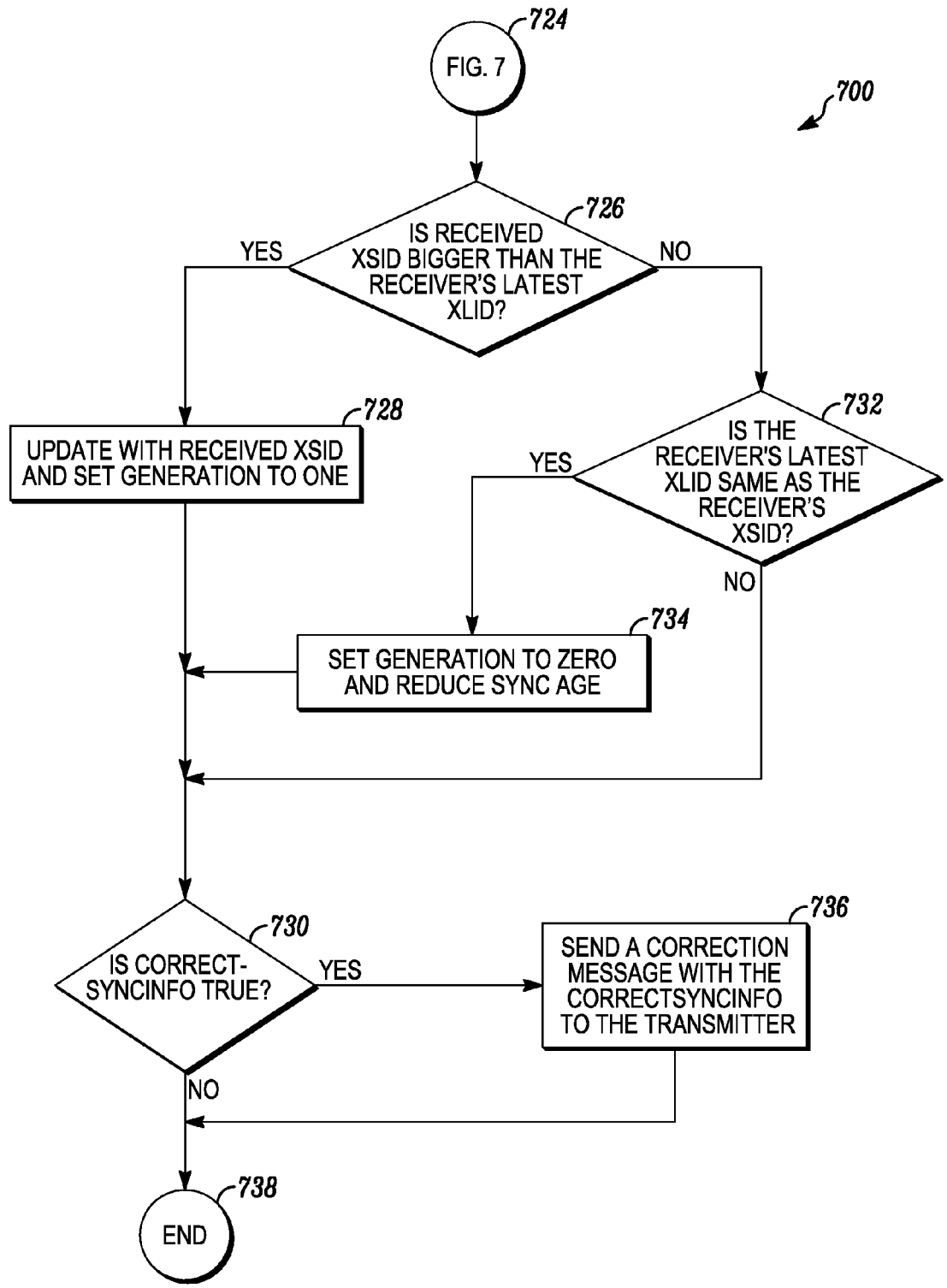
FIG. 8 is a flow diagram illustrating a method in accordance with some embodiments.

Referring now to FIGS. 7 and 8, a logical flowchart illustrating a method 700 in accordance with some embodiments of the present teachings is shown, wherein FIG. 8 is a continuation of FIG. 7. The method 700, performed by a subscriber unit, starts at 702 where the subscriber unit receives a channel timing message, such as a beacon message, a forced propagation message, a correction message, or a terminator message. For ease of describing the FIGS. 7 and 8, the subscriber unit is termed as a "receiver." At 704, method 700 performs initializations. For example, the received XLID (Extended Leader ID) is generated by concatenating the received LDR DLI (420 of FIG. 4), leader ID (414 of FIG. 4), and the leader ID postfix (418 of FIG. 4). The received LDR DLI is the most significant portion of the received XLID while the leader ID postfix is the least significant portion of the received XLID. Similarly, method 700 generates the receiver's XLID at 704. In addition, the received XSID (Extended Source ID) generated by concatenating the received SRC DLI (430 of FIG. 4), source ID (424 of FIG. 4), and the source ID postfix (428 of FIG. 4). The received SRC DLI is the most significant portion of the received XSID while the source ID postfix is the least significant portion of the received XSID. Similarly, method 700 generates the receiver's XSID at 704.

At 706, method 700 compares the received XLID with the receiver's XLID. If the received XLID is smaller than the receiver's XLID, method 700 transitions to 722. If the received XLID is bigger than the receiver's XLID, method 700 updates the receiver's (i.e., the subscriber unit) Channel Timing, XLID, and Sync Age with the received Channel Timing, XLID and Sync Age respectively at 708. In addition, method 700 updates the receiver's generation to the received generation and increments the receiver's updated generation by one at 708. After 708, method 700 transitions to 722. Turning back to 706, if the received XLID is same as the receiver's XLID, method 700 compares the received Sync Age with the receiver's Sync Age at 710. If the received Sync Age is bigger than the sum of the receiver's Sync Age and a tolerance range, method 700 transitions to 722. The tolerance range is number that can be zero or bigger than zero. If the sum of the received Sync Age and the tolerance range is smaller than the receiver's Sync Age, method 700 updates the receiver's Channel Timing and Sync Age with the received Channel Timing and Sync Age at 712. In addition, method 700 updates the receiver's generation to the received generation and increments the receiver's updated generation by one at 712. After 712, method 700 transitions to 722.

Turning back to 710 in FIG. 7, if the difference between the received Sync Age and the receiver's Sync Age is not greater than the tolerance range, the received Sync Age is regarded as the same as the receiver's Sync Age. In such a case, the method 700 compares the received generation with the receiver's generation at 714. If the received generation is bigger than the receiver's generation, method 700 transitions to 722. If the received generation is smaller than the receiver's generation, method 700 updates the receiver's Channel Timing with the received Channel Timing and also updates the receiver's generation to the received generation and increments the receiver's updated generation by one at 718. After 718, method 700 transitions to 722. Turning back to 714, if received generation is same as the receiver's generation, method 700 updates the receiver's Channel Timing to the average of the receiver's Channel Timing and the received Channel Timing at 720. After 720, method 700 transitions to 722. Channel timing evaluation and update of method 700 at 722 is further illustrated by reference to FIG. 8.

Turning now to FIG. 8, at 724, method 700 continues from 722 of FIG. 7. At 726, method 700 compares the received XSID with the receiver's latest XLID. If the received XSID is bigger than the receiver's latest XLID, the sending subscriber unit of the received channel timing should be the channel timing leader radio. In such a case, method 700 sets the receiver's XLID to the received XSID and the receiver's generation to one at 728. After 728, method 700 transitions to 730. Turning back to 726, if the received XSID is not bigger than the receiver's latest XLID, method 700 compares the receiver's latest XLID with the receiver's XSID at 732. If the receiver's latest XLID is not same as the receiver's XSID, method 700 transitions to 730. If the receiver's latest XLID is same as the receiver's XSID, the receiver should be the channel timing leader radio. In such a case, method 700 sets the receiver's generation and Sync Age to zero at 734. After 734, method 700 transitions to 730. At 730, method 700 determines whether to send a channel timing correction message to the sender of the channel timing message received at the receiver. For example, when the receiver's channel timing is correct, the receiver will send a correction message to the sender, wherein the correction message establishes the correct channel timing. If method 700 determines that the receiver needs to send a correction message, method 700 constructs the correction message and sends the correction message to the sender of the channel timing message received at the receiver, at 736. Method 700 terminates at 738.

When a subscriber unit is ready to transmit a channel timing message, such as a beacon message, a forced propagation message, a correction message, or a response message, the subscriber unit starts a RHOT. Upon expiration of the RHOT, the subscriber unit transmits the channel timing message. The timeout value of the RHOT is selected using a probability density function (PDF), such as a uniform distribution, in one embodiment. The PDF of the RHOT changes based on some "time measure" since the subscriber unit last successfully transmitted a channel timing message.

Stated another way, the subscriber unit determines a distribution for the value of its RHOT based on some time measure since the subscriber unit last successfully transmitted a forced propagation measure. In one illustrative implementation, the subscriber unit determines the distribution for the value of its RHOT based on a number of times the subscriber unit set and then canceled its RHOT prior to expiry, since its last successful transmission of a CT CSBK following a RHOT timeout. Moreover, in another example implementation, determining the distribution of the RHOT value comprises selecting a mean for the distribution that has an inverse relationship with the time measure. In an alternative implementation, the time measure can be the actual time, measured in seconds or minutes, since the subscriber unit last successfully transmitted a channel timing message.

Figure 9:
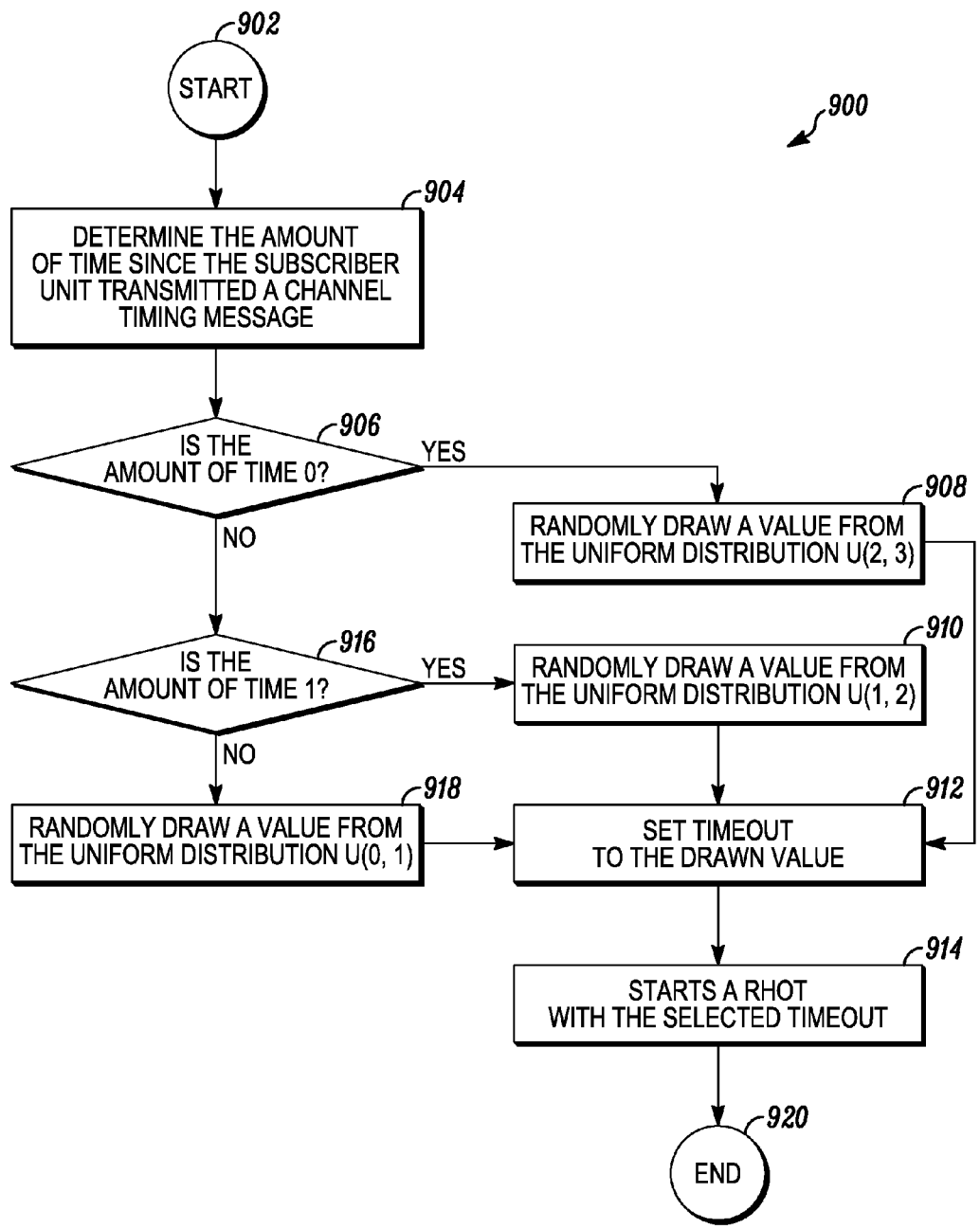
FIG. 9 is a flow diagram illustrating a method in accordance with some embodiments.

The RHOTs and PDFs are further illustrated by reference to FIGS. 9-14. Turning now to FIG. 9, a logical flowchart illustrating a method 900 in accordance with some embodiments is shown. The method 900 is performed by a subscriber unit, and starts at 902 where the subscriber unit needs to select a timeout value in order to start a RHOT timer. At 904, the subscriber unit determines the amount of time since the subscriber unit transmitted a channel timing message. Herein, this amount of time is defined as the number of times the subscriber unit started a RHOT, but did not transmit a channel timing message, since the subscriber last successfully transmitted a channel timing message. The amount of time has an inverse relationship with the mean of the PDF from which the subscriber unit draws a timeout value for the RHOT. Alternate embodiments may use a different type of relationship between the amount of time and a PDF from which the subscriber unit draws a timeout value for the RHOT. At 906, method 900 checks whether the determined amount of time is zero. If the determined amount of time is zero, the subscriber unit randomly draws a value from uniform PDF, e.g., U(2,3) with boundaries at the two-second and three-second marks. The uniform PDF U(2,3) has a mean of 2.5 seconds, and will be further illustrated by reference to FIG. 10.

Turning back to 906 of FIG. 9, if the determined amount of time is bigger than zero, method 900 checks whether the determined amount of time is one at 916. If the determined amount of time is one, method 900 randomly draws a value from a uniform PDF U(1,2) at 910. The uniform PDF U(1,2) has a mean of 1.5 seconds, and will be further illustrated by reference to FIG. 10. Referring back to 916, if the determined amount of time is bigger than one, method 900 randomly draws a value from a uniform PDF U(0,1) at 918. The uniform PDF U(0,1) has a mean of 0.5 seconds, and will be further illustrated by reference to FIG. 10. After a random value is drawn at 908, 910, or 918, method 900 sets the randomly drawn value as the timeout for a RHOT at 912, and starts the RHOT at 914. Method 900 ends at 920.

Figure 10:
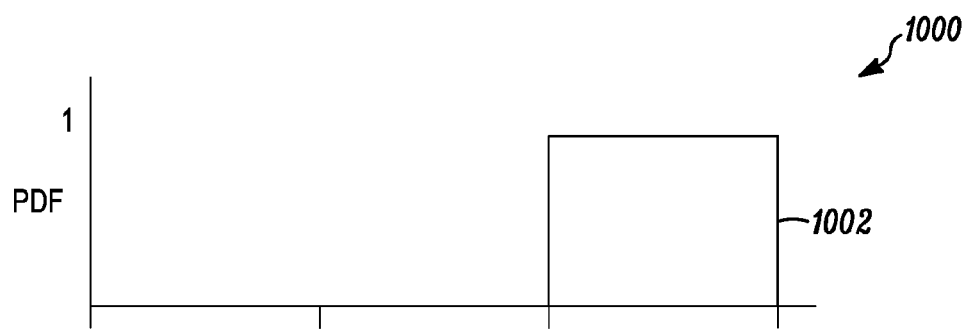
FIG. 10 illustrates a uniform distribution within a random holdoff window in accordance with some embodiments.
Figure 10:
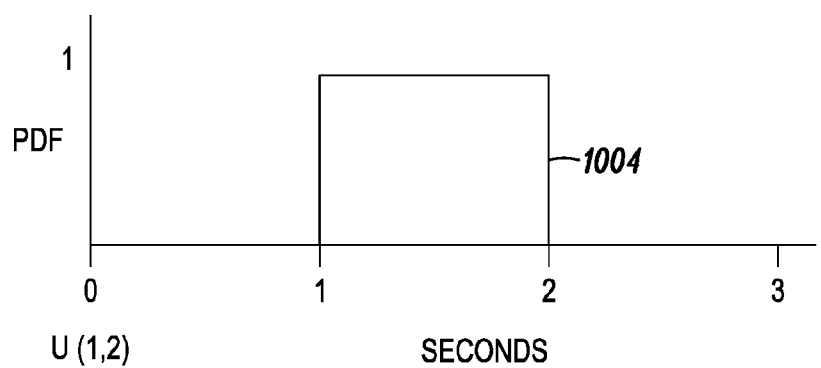
Figure 10:
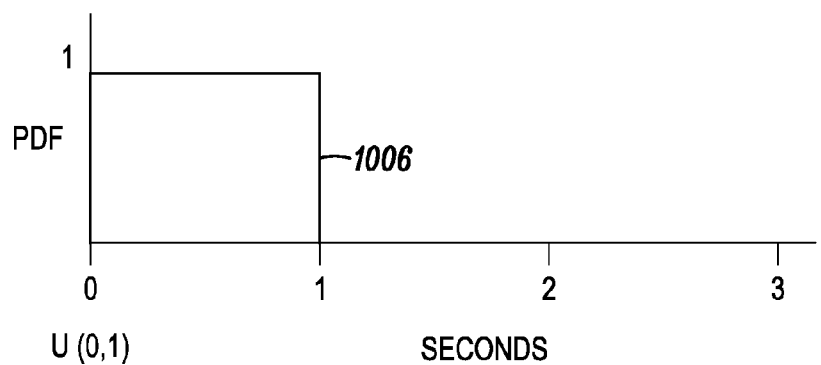

Turning now to FIG. 10, three uniform PDFs in accordance with some embodiments are shown and indicated generally at 1000. A uniform PDF 1002 (also referred to as U(2,3)) has boundaries at the two-second and three-second marks on the horizontal time axis. A uniform PDF 1004 (also referred to as U(1,2)) has boundaries at the one-second and two-second marks on the horizontal time axis. In addition, a uniform PDF 1006 (also referred to as U(0,1)) has boundaries at the zero-second and one-second marks on the horizontal time axis. The means of U(2,3), U(1,2), and U(0,1) are 2.5 seconds, 1.5 seconds, and 0.5 seconds, respectively.

Figure 11:
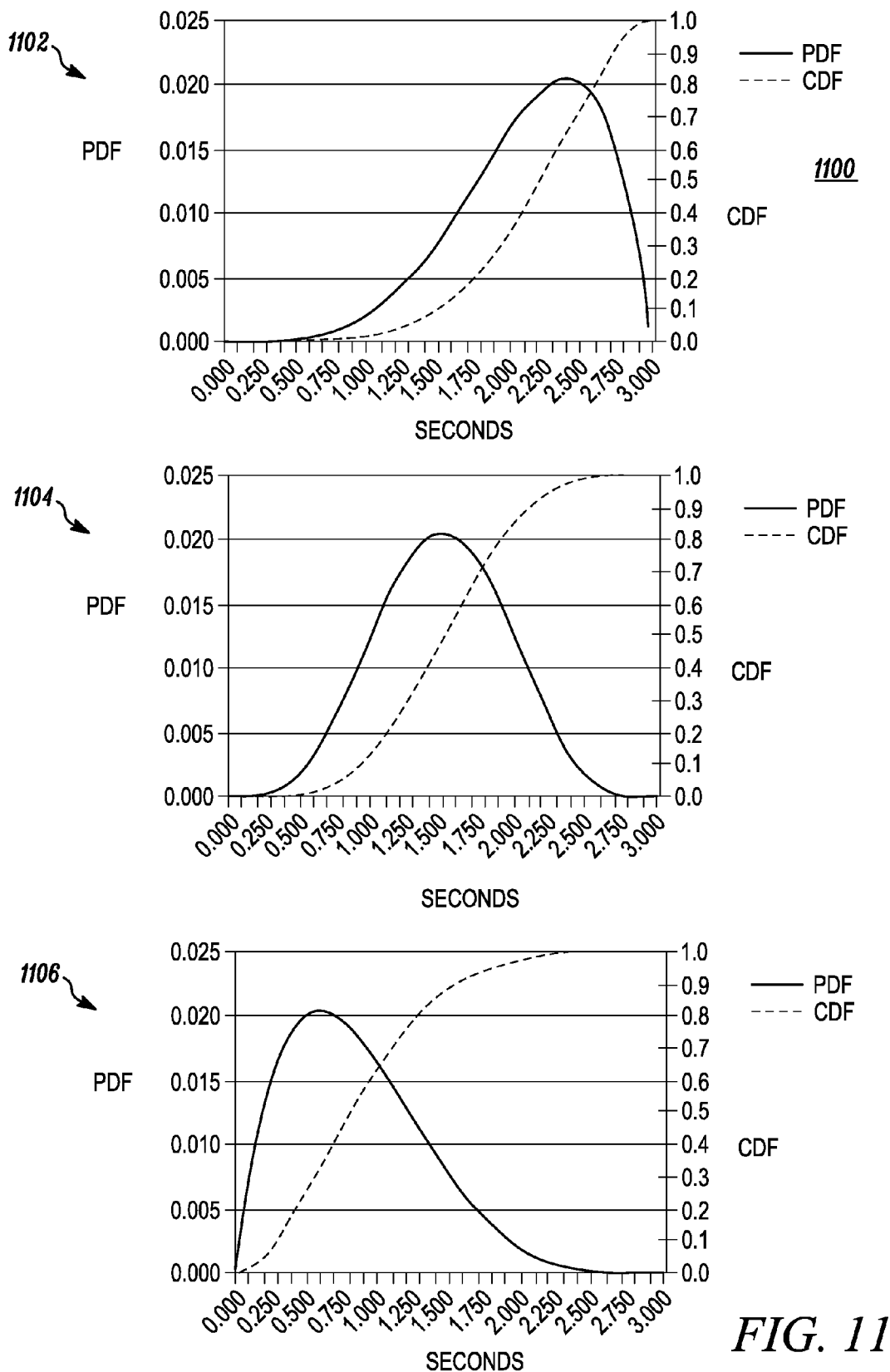
FIG. 11 illustrates a Beta distribution within a random holdoff window in accordance with some embodiments.

In an alternative embodiment, method 900 may use different PDFs to draw a random value. For example, method 900 may use Beta distributions to draw a random value. Referring now to FIG. 11, three Beta distributions in accordance with some embodiments of present disclosure are shown and indicated generally at 1100. A Beta distribution 1102 has an Alpha of five and a Beta of two, while a Beta distribution 1104 has an Alpha of five and a Beta of five. Moreover, a Beta distribution 1106 has an Alpha of two and a Beta of five. Among the three Beta distributions (e.g., 1102, 1104, and 1106), the Beta distribution 1102 has the biggest mean, while the Beta distribution 1106 has the smallest mean. To use the three Beta distributions (1102, 1104, and 1106), method 900 (FIG. 9) randomly draws a value from the Beta distribution 1102 when the determined amount of time is zero (at 908 of FIG. 9), randomly draws a value from the Beta distribution 1104 when the determined amount of time is one (at 910 of FIG. 9), and randomly draws a value from the Beta distribution 1106 when the determined amount of time is bigger than one (at 918 of FIG. 9).

Figure 13:
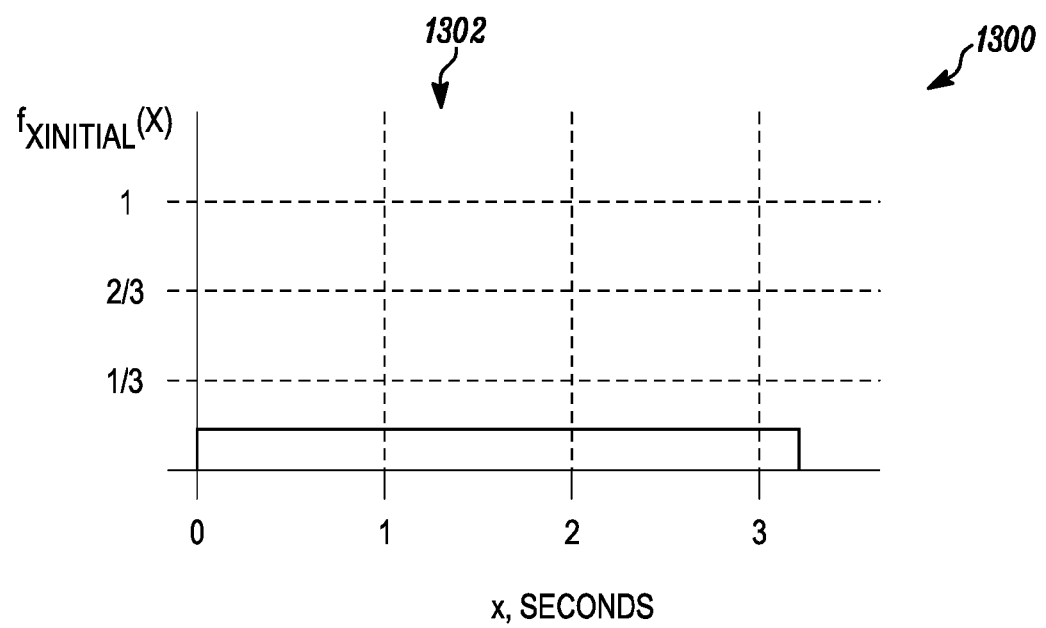
FIG. 13 illustrates a uniform distribution within a random holdoff window in accordance with some embodiments.
Figure 14:
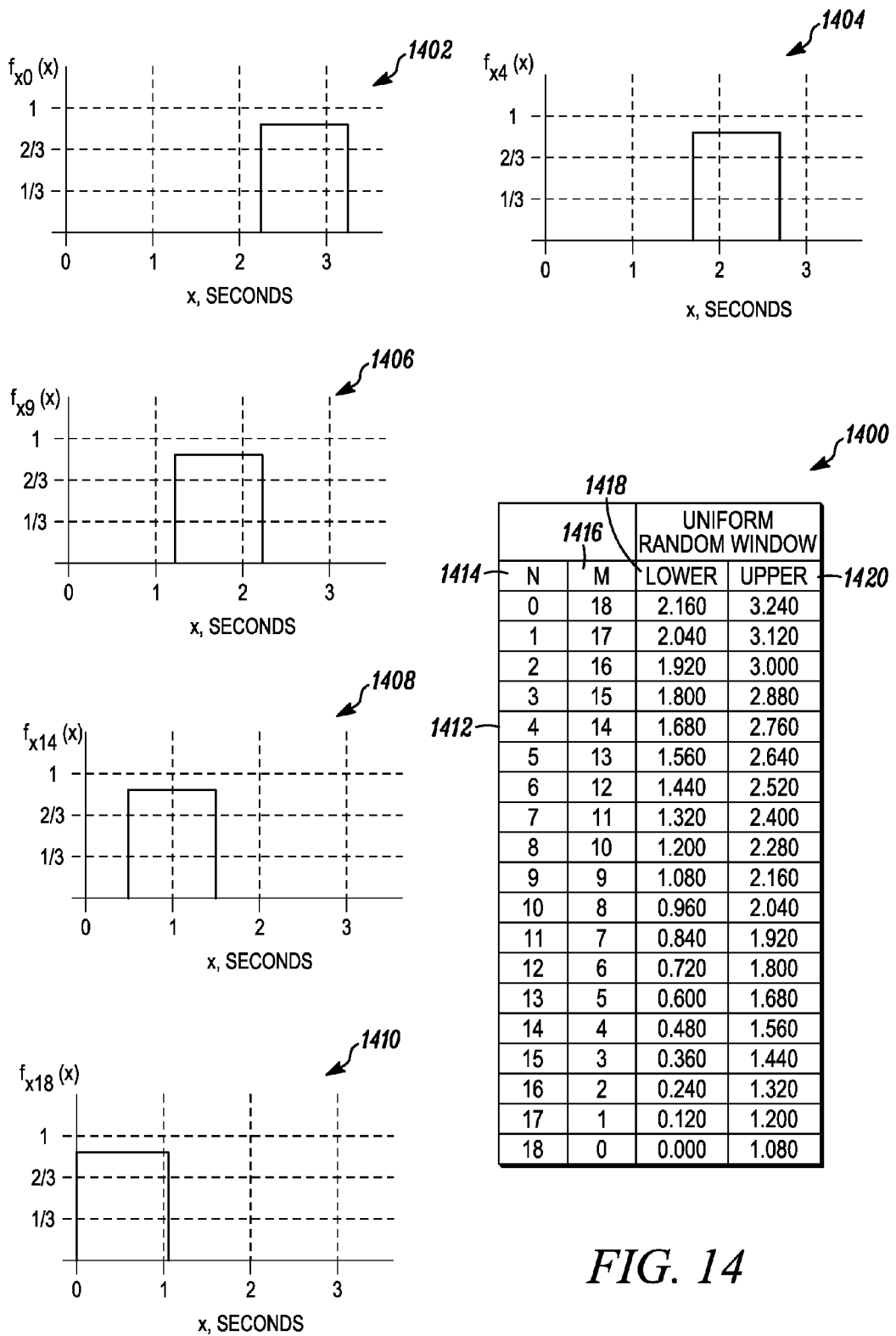
FIG. 14 illustrates a set of sliding window distributions within a random holdoff window in accordance with some embodiments.

In yet another embodiment, a timeout value for a RHOT can be selected by using a sliding window uniform distribution, for example a sliding window uniform distribution over 3.24 seconds with a window size of 1.08 seconds. The sliding window uniform distribution is further illustrated by reference to FIGS. 12-14. Turning now to FIG. 14, a sliding window uniform distribution in accordance with some embodiments are shown and indicated generally at 1400. A sliding window uniform distribution function table 1412 comprises a distribution index column 1414, a distribution reverse index column 1416, a lower boundary column 1418, and an upper boundary column 1420. The value in the column 1414 (also interchangeably referred to herein as index N) ranges from zero to eighteen, while the value in column 1416 (also interchangeably referred to herein as index M) ranges from eighteen to zero. Furthermore, the sum of the values in the column 1414 and the column 1416 is eighteen for each row of the table 1412. Each row of the table 1412 defines a uniform distribution function, U(Lower, Upper), wherein Lower denotes the value in the column 1418 and Upper denotes the value in the column 1420 of the table 1412.

For example, the row with a value of zero in the column 1414 defines a uniform distribution 1402, wherein the lower boundary and the upper boundary are 2.160 seconds from the column 1418 and 3.240 seconds from the column 1418 respectively. A uniform distribution 1404 is defined by the row with a value of four in the column 1412. The boundaries of the distribution 1404 are 1.680 seconds and 2.760 seconds respectively. A uniform distribution 1406 is defined by the row with a value of nine in the column 1412. The boundaries of the distribution 1406 are 1.080 seconds and 2.160 seconds respectively. The row with a value of fourteen in the column 1414 defines a uniform distribution 1408, wherein the lower boundary and the upper boundary are 0.480 seconds and 1.560 seconds respectively. A uniform distribution 1410 is defined by the row with a value of eighteen in the column 1412. The boundaries of the distribution 1406 are zero seconds and 1.080 seconds respectively. The approach to select a timeout value for a RHOT using the sliding window uniform distributions is further illustrated by reference to FIG. 12.

Figure 12:
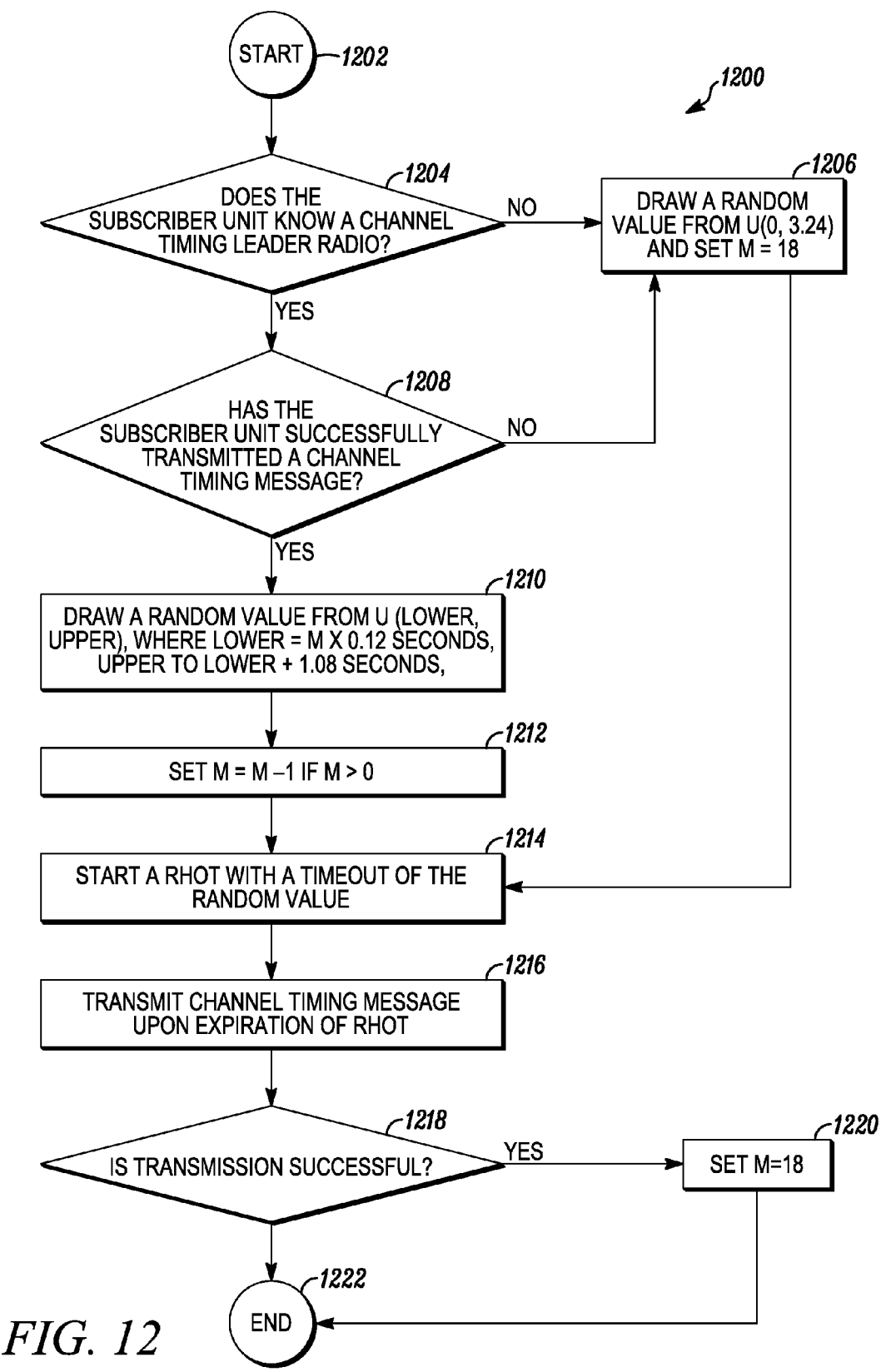
FIG. 12 is a flow diagram illustrating a method in accordance with some embodiments.

Turning now to FIG. 12, a logical flowchart illustrating a method 1200 in accordance with some embodiments is shown. The method 1200, performed by a subscriber unit, starts at 1202 where the subscriber unit is ready to transmit a channel timing message, such as a beacon message, a forced propagation message, a correction message, or a response message, and the subscriber unit needs to generate a timeout value in order to start a RHOT. At 1204, method 1200 checks whether the subscriber unit has or knows a channel timing leader radio. If the subscriber unit does not have a channel timing leader radio, method 1200 draws a random value from a uniform distribution U(0, 3.24) at 1206. The uniform distribution U(0, 3.24) is further illustrated by reference to FIG. 13. At 1206, method 1200 also sets an integer variable M to the value of eighteen. Turning now to FIG. 13, an illustrative uniform probability density function in accordance with some embodiments is shown and indicated generally at 1300. A uniform PDF 1302 has a lower boundary at 0 seconds and an upper boundary at 3.24 seconds. The uniform PDF is also interchangeably referred to herein as U(0, 3.24).

Turning now back to 1204 of FIG. 12, if the subscriber unit does have a channel timing leader radio, method 1200 checks whether the subscriber unit has successfully transmitted a channel timing message at 1208, such as a beacon message, a forced propagation message, a correction message, or a response message. If the subscriber unit has not successfully transmitted a channel timing message, method 1200 transitions to 1206. If the subscriber unit has successfully transmitted a channel timing message, method 1200 draws a random value from the uniform distribution U(Lower, Upper) at 1210, wherein Lower is the product of M and 0.12 seconds, while Upper is the sum of Lower and 1.08 seconds. As used herein, each U(Lower, Upper) is a distribution function defined in the table 1412 of FIG. 14, and M represents a value of the column 1416 of FIG. 14. For example, when M is nine, the uniform distribution U(Lower, Upper) is U(1.08,2.16), i.e., the uniform distribution 1406 of FIG. 14.

Method 1200 further decrements the integer variable M by one when M is bigger than zero at 1212. After a random value is drawn at 1206 or 1210, method 1200 starts a RHOT with a timeout of the drawn value at 1214. For example, the timeout is set to 2.12 seconds if the randomly drawn value is 2.12 seconds. At 1216, method 1200 transmits the channel timing message upon expiration of the RHOT. Method 1200 checks whether the transmission is successful at 1218. If the transmission is successful, method 1200 sets the integer variable M to a value of eighteen at 1220. Method 1200 ends at 1222.

There are some situations where a subscriber unit may not have the correct channel timing. For example, when a subscriber unit powers up or tunes to a 6.25e 2:1 TDMA direct mode channel from repeater mode, the subscriber unit does not have the correct channel timing of the direct mode channel that the subscriber unit is operating on. In such cases, the subscriber unit starts a first timer with a timeout approximately equal to the beacon interval, and passively monitors the channel for a channel timing message. The subscriber unit cancels the first timer if the subscriber unit receives the channel timing message before the first timer expires. If the subscriber unit fails to receive the channel timing message before the first timer expires, the subscriber unit starts a second timer. The second timer is a fixed timer if the timeout value of the second timer is always the same value. To the contrary, the second timer is a RHOT when the timeout of the second timer is drawn from a random distribution, such as U(0,1), U(0,3), or U(0,3.24). Upon the expiration of the second timer, the subscriber unit transmits a request message for channel timing, and waits for a response message to the request message. The request message comprises a CT CSBK burst, in one embodiment.

There are also some situations where a subscriber unit should send a request for channel timing even when the subscriber unit still has correct channel timing. In one illustrative example, when a subscriber unit fails to receive a predetermined number of (e.g., two) consecutive beacon messages or forced propagation message, the subscriber unit still has correct channel timing, but the correct channel timing is about to expire. In such cases, the subscriber unit starts a RHOT and monitors for channel timing messages.

Alternatively, the subscriber unit may wait for certain amount of time, such as a whole Diffusion Window or one third of a Diffusion Window, before the subscriber unit starts the RHOT. If the subscriber unit does not receive channel timing message before the RHOT expires, the subscriber unit transmits a request message for channel timing and waits for a response message to the request message. The subscriber unit transmits the request message during the latter portion of a Diffusion Window, while the beginning portion of the Diffusion Window is reserved for forced propagation to occur. When the subscriber unit fails to receive channel timing for a certain amount time, the subscriber unit may determine that it has no channel timing leader radio or channel timing. In such a case, the subscriber unit sets leader identifiers to zero because it has no leader radio.

When a subscriber unit receives a request message for channel timing, the subscriber unit transmits a response message with Sync Info in the same manner as how a forced propagation message is transmitted. For example, a RHOT is started with the timeout value of the RHOT drawn from a random distribution. Before the expiration of the RHOT, the response message is not transmitted and is in a pending state. When the response message is pending, the subscriber unit withholds and cancels the pending response message if the subscriber unit observes another subscriber unit's response message to the request message, and the channel timing in the latter response message is as good as or better than the channel timing contained in the pending response message.

Persons of skill in the art will understand that this disclosure may be extended to other embodiments than those specifically disclosed herein. In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article or apparatus that comprises, has, includes, contains a list of elements does not include only those elements but may include other elements not expressly listed or inherent to such process, method, article, or apparatus. An element proceeded by "comprises . . . a", "has . . . a", "include . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device or structure that is "configured" in a certain way is configured in at least that way, but may also be configured in ways that are not listed. Also, the sequence of steps in a flow diagram or elements in the claims, even when preceded by a letter does not imply or require that sequence.

Moreover, an embodiment can be implemented as a computer-readable storage medium having computer readable code stored thereon for programming a computer (e.g., comprising a processor) to perform a method as described and claimed herein. Examples of such computer-readable storage medium include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for diffusing channel timing among a plurality of subscriber units operating in Time Division Multiple Access (TDMA) Direct Mode, the method comprising:
   a first one of the subscriber units operating in the TDMA Direct Mode and performing:
   receiving, from a second one of the subscriber units operating in the TDMA Direct Mode, a first message;
   determining first channel timing from the received message; determining whether the received first channel timing is correct, wherein the determining is based at least on comparing a generation of the first subscriber unit with a generation of the second subscriber unit;
   when the received first channel timing is correct, starting a random delay;
   upon expiration of the random delay, transmitting a first forced propagation message to propagate the first channel timing to at least a third one of the subscriber units operating in the TDMA Direct Mode and having a higher generation than the generations of the first and the second subscriber units;
   receiving before the expiration of the random delay, from one of the subscriber units operating in the TDMA Direct Mode and having the same or a higher generation than the first subscriber unit, a second forced propagation message that includes the first channel timing; and
   withholding the transmission of the first forced propagation message with the first channel timing.

2. The method of claim 1, wherein the first message comprises one of a beacon message, a forced propagation message, a correction message, or a terminator message.

3. The method of claim 2, wherein the first message comprises a Control Signaling Block burst structure that includes the generation of the second subscriber unit.

4. The method of claim 1 further comprising determining a distribution of the random delay based on a time measure since the first subscriber unit last transmitted a forced propagation message that includes channel timing.

5. The method of claim 4, wherein the time measure is defined as a number of times the first subscriber unit started the random delay and then canceled the random delay before its expiration, since the first subscriber unit last transmitted a forced propagation message that includes channel timing.

6. The method of claim 4, wherein the amount of time is the number of times the first subscriber unit started the random delay and withheld the transmission of a forced propagation message.

7. The method of claim 4, wherein determining the random distribution of the random delay comprises selecting a mean for the distribution that has an inverse relationship with the time measure.

8. The method of claim 4, wherein the distribution is one of a uniform distribution, a Beta distribution, or a sliding window uniform distribution.

9. The method of claim 1, wherein determining whether the received first channel timing is correct comprises:
   determining first synchronization information from the first message, wherein the first synchronization information comprises the generation of the second subscriber unit, and one or both of a first leader identifier, or a first synchronization age; and
   comparing the first synchronization information to second synchronization information at the first subscriber unit, wherein the second synchronization information comprises the generation of the first subscriber unit, and one or both of a second leader identifier, or a second synchronization age.

10. The method of claim 1, wherein when the first channel timing is incorrect, the method further comprising sending a second message to correct the channel timing at least the second subscriber unit.

11. A method for diffusing channel timing among a plurality of subscriber units operating in Time Division Multiple Access (TDMA) Direct Mode, the method comprising:
  a first one of the subscriber units operating in the TDMA Direct Mode and performing:
  determining that the first subscriber unit should request channel timing;
  starting a delay;
  upon expiration of the delay, transmitting a request message for channel timing;
  receiving, from a second one of the subscriber units operating in the TDMA Direct Mode, a first response message;
  determining first channel timing from the first response message;
  determining whether the first channel timing is correct, wherein the determining is based at least on comparing a generation of the first subscriber unit with a generation of the second subscriber unit;
  when the first channel timing is correct, accepting the first channel timing;
  receiving before the expiration of the delay, from one of the subscriber units operating in the TDMA Direct Mode, a second message;
  determining second channel timing from the second message; and
  withholding the transmission of the request message when the second channel timing is correct.

12. The method of claim 11, wherein the first response message comprises a Control Signaling Block burst structure that includes the generation of the second subscriber unit.

13. The method of claim 11, wherein the second message is one of a beacon message, a forced propagation message, a correction message, or a terminator message.

14. The method of claim 11, wherein determining whether the first channel timing is correct comprises:
  determining first synchronization information from the first response message, wherein the first synchronization information comprises the generation of the second subscriber unit, and one or both of a first leader identifier, or a first synchronization age; and
  comparing the first synchronization information to second synchronization information at the first subscriber unit, wherein the second synchronization information comprises the generation of the first subscriber unit, and one or both of a second leader identifier, or a second synchronization age.

15. The method of claim 11 further comprising:
  the second subscriber unit performing:
  receiving the request message;
  starting a random delay; and
  upon expiration of the random delay, transmitting the first response message.

16. The method of claim 15 further comprising:
  observing a second response message, from one of the subscriber units operating in the TDMA Direct Mode, to the request message, wherein the second response message;
  determining second channel timing from the second response message;
  determining that the second channel timing is correct;
  determining that the first response message is pending; and
  cancelling the transmission of the first response message.

17. A non-transitory computer-readable storage element having computer readable code stored thereon for programming a computer to perform a method of diffusing channel timing among a plurality of subscriber units operating in Time Division Multiple Access (TDMA) Direct Mode, the method comprising:
  receiving, from a first one of the subscriber units operating in the TDMA Direct Mode, a first message;
  determining first channel timing from the first message;
  determining whether the received first channel timing is correct, wherein the determining is based at least on comparing a generation of the computer with a generation of the second subscriber unit;
  when the received first channel timing is correct, starting a random delay;
  upon expiration of the random delay, transmitting a first forced propagation message to propagate the first channel timing to at least a second one of the subscriber units operating in the TDMA Direct Mode and having a higher generation than the generations of the computer and the first subscriber unit;
  receiving before the expiration of the random delay, from one of the subscriber units operating in the TDMA Direct Mode and having the same or a higher generation than the first subscriber unit, a second forced propagation message that includes the first channel timing; and
  withholding the transmission of the first forced propagation message with the first channel timing.

* * * * *